US012641615B2

(12) United States Patent
Kusashima et al.

(10) Patent No.: US 12,641,615 B2
(45) Date of Patent: May 26, 2026

(54) TERMINAL DEVICE, BASE STATION APPARATUS, AND COMMUNICATION METHOD

(71) Applicant: Sony Group Corporation, Tokyo (JP)

(72) Inventors: Naoki Kusashima, Tokyo (JP); Ken Tanaka, Tokyo (JP); Hiroki Matsuda, Tokyo (JP); Shinichiro Tsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 422 days.

(21) Appl. No.: 17/770,057

(22) PCT Filed: Nov. 24, 2020

(86) PCT No.: PCT/JP2020/043587
§ 371 (c)(1),
(2) Date: Apr. 19, 2022

(87) PCT Pub. No.: WO2021/106837
PCT Pub. Date: Jun. 3, 2021

(65) Prior Publication Data
US 2022/0400470 A1      Dec. 15, 2022

(30) Foreign Application Priority Data
Nov. 29, 2019    (JP) ................................. 2019-217326

(51) Int. Cl.
*H04W 72/23*        (2023.01)
*H04L 27/26*        (2006.01)
*H04W 72/0453*      (2023.01)

(52) U.S. Cl.
CPC ......... *H04W 72/23* (2023.01); *H04L 27/2602* (2013.01); *H04W 72/0453* (2013.01); *H04L 27/2614* (2013.01)

(58) Field of Classification Search
CPC ............. H04W 72/23; H04W 72/0453; H04W 72/1273; H04L 27/2602; H04L 27/2614;
(Continued)

(56) References Cited

U.S. PATENT DOCUMENTS 9,210,708 B1* 12/2015 Li ........................ H04L 27/2601
2010/0272051 A1* 10/2010 Fu ........................ H04L 5/0046
370/329
(Continued)

FOREIGN PATENT DOCUMENTS

CN        102257860 A      11/2011
CN        109151981 A       1/2019
(Continued)

OTHER PUBLICATIONS

International Search Report and Written Opinion mailed on Feb. 2, 2021, received for PCT Application PCT/JP2020/043587, Filed on Nov. 24, 2020, 9 pages including English Translation.
(Continued)

*Primary Examiner* — Sai Aung
*Assistant Examiner* — Wilfred Thomas
(74) *Attorney, Agent, or Firm* — XSENSUS LLP

(57)                ABSTRACT

A terminal device (2) according to the present disclosure includes a control unit (203). The control unit (203) acquires, from a base station apparatus (1), information about a signal waveform for use, of a plurality of signal waveforms including a single carrier signal, the signal waveform for use being used for downlink communication with the base station apparatus (1), the information being transmitted by using a predetermined signal waveform of the plurality of signal waveforms. The control unit (203) performs the downlink communication with the base station apparatus (1) by using the signal waveform for use, on the basis of the information.

11 Claims, 14 Drawing Sheets

(58) Field of Classification Search
CPC ....... H04L 5/0007; H04L 5/001; H04L 5/005;
H04L 5/0053; H04L 27/2628; H04L
27/2636; H04L 27/265; H04L 27/26526;
H04L 27/0008; H04L 27/264
See application file for complete search history.

(56) References Cited

U.S. PATENT DOCUMENTS

| | | | | |
|---|---|---|---|---|
| 2011/0110296 | A1* | 5/2011 | Malladi | H04W 72/23 |
| | | | | 370/328 |
| 2011/0205966 | A1* | 8/2011 | Iwai | H04L 27/0008 |
| | | | | 370/328 |
| 2011/0207493 | A1* | 8/2011 | Taoka | H04W 52/28 |
| | | | | 455/509 |
| 2017/0311296 | A1* | 10/2017 | Onggosanusi | H04B 7/0456 |
| 2018/0092095 | A1* | 3/2018 | Zeng | H04L 27/2666 |
| 2018/0262900 | A1* | 9/2018 | Moon | H04L 27/26 |
| 2018/0279292 | A1* | 9/2018 | Luo | H04L 5/0023 |
| 2018/0287840 | A1* | 10/2018 | Akkarakaran | H04L 27/262 |
| 2018/0294916 | A1* | 10/2018 | Akkarakaran | H04L 5/0092 |
| 2019/0208525 | A1* | 7/2019 | Xue | H04W 72/51 |
| 2019/0289591 | A1 | 9/2019 | Lin | |
| 2020/0169351 | A1* | 5/2020 | Yoshimura | H04L 5/0055 |
| 2020/0412590 | A1* | 12/2020 | Akkarakaran | H04L 27/26136 |
| 2021/0250921 | A1* | 8/2021 | Zhang | H04W 56/0015 |
| 2021/0351967 | A1* | 11/2021 | Huang | H04L 27/26416 |
| 2021/0368505 | A1* | 11/2021 | Maki | H04L 27/263 |
| 2022/0039113 | A1* | 2/2022 | Choi | H04W 56/0015 |
| 2022/0060905 | A1* | 2/2022 | Niu | H04W 72/0453 |
| 2022/0264492 | A1* | 8/2022 | Kim | H04L 27/2607 |
| 2022/0330155 | A1* | 10/2022 | Cheng | H04W 72/0453 |

FOREIGN PATENT DOCUMENTS

| | | | |
|---|---|---|---|
| CN | 109792423 | A | 5/2019 |
| CN | 109845167 | A | 6/2019 |
| CN | 110431795 | A | 11/2019 |
| CN | 110495116 | A | 11/2019 |
| JP | 2012-524487 | A | 10/2012 |
| KR | 2015-0144331 | A | 12/2015 |
| WO | 2018/057431 | A1 | 3/2018 |
| WO | WO-2018143275 | A1 | 8/2018 |
| WO | 2018/186938 | A1 | 10/2018 |

OTHER PUBLICATIONS

3GPP, "Study on requirements for NR beyond 52.6 GHZ (Release 16)", 3GPP TR 38.807 V0.2.0, Jun. 2019, pp. 1-66.
Panasonic, "PDCCH enhancements for NR URLLC", 3GPP TSG RAN WGI #99, R1-1912747, Nov. 18-22, 2019, 9 pages.
Notice of Allowance issued on Feb. 18, 2026, in corresponding Korean patent Application No. 10-2022-7015776, 7 pages.

* cited by examiner

RADIO RECEIVER

301

SIGNAL WAVEFORM SWITCHING UNIT

303

FIRST SIGNAL WAVEFORM RECEPTION UNIT

305

SECOND SIGNAL WAVEFORM RECEPTION UNIT

303

FIRST SIGNAL WAVEFORM RECEPTION UNIT

3031

CP REMOVAL UNIT

3033

S/P UNIT

3035

DFT UNIT

Size-M

Size-N

3037

P/S UNIT

FIG.18

TERMINAL DEVICE, BASE STATION APPARATUS, AND COMMUNICATION METHOD

CROSS-REFERENCE TO RELATED APPLICATIONS

The present application is based on PCT filing PCT/JP2020/043587, filed Nov. 24, 2020, which claims priority to Japanese Patent Application No. 2019-217326, filed Nov. 29, 2019, the entire contents of each are incorporated herein by reference.

FIELD

The present disclosure relates to a terminal device, a base station apparatus, and a communication method.

BACKGROUND

A radio access system and a radio network for cellular mobile communication (hereinafter, also referred to as "Long Term Evolution (LTE)", "LTE-Advanced (LTE-A)", "LTE-Advanced Pro (LTE-A Pro)", "New Radio (NR)", "New Radio Access Technology (NRAT)", "Evolved UniversaLTErrestrial Radio Access (EUTRA)", or "Further EUTRA (FEUTRA)") are considered in 3rd GeneRATion Partnership Project (3GPP). Note that, in the following description, LTE includes LTE-A, LTE-A Pro, and EUTRA, and NR includes NRAT and FEUTRA. In LTE and NR, a base station apparatus (base station) is also referred to as evolved NodeB (eNodeB) in LTE and gNodeB in NR, and a terminal device (mobile station, mobile station apparatus, or terminal) is also referred to as User Equipment (UE). LTE and NR are cellular communication systems in which a plurality of areas covered by the base station apparatuses is arranged in cells. Note that a single base station apparatus may manage a plurality of cells.

NR is Radio Access Technology (RAT), as a next generation radio access method next to LTE, which is different from the LTE. NR is an access technology that is configured to support various use cases including Enhanced mobile broadband (eMMB), Massive machine type communications (mMTC), and Ultra reliable and low latency communications (URLLC). NR has been studied for a technical framework that addresses usage scenarios, requirement conditions, and deployment scenarios in these use cases.

In addition, in NR, use of a high frequency band called millimeter wave ranging from 52.6 GHz to 110 GHz has been studied in response to demands for a wider band. In various use cases, such as High data RATe eMBB, Mobile data offloading, and Vertical industry factory application, use of the millimeter waves have been studied. For example, Non Patent Literature 1 discloses a study on use of the millimeter waves in 3GPP.

CITATION LIST

Non Patent Literature

Non Patent Literature 1: 3GPP TR 38.807 V0.2.0 "3rd GeneRATion Partnership Project; Technical Specification Group Radio Access Network; Study oN Requirements for NR beyond 52.6 GHz (Release 16)" June, 2019.

SUMMARY

Technical Problem

In the millimeter waves described above, a signal waveform having low Peak to Average Power RATio (PAPR) is required particularly in a region having a large transmission power, due to the problem of non-linearity of a power amplifier (PA). However, Cyclic Prefix-Orthogonal Frequency Division Multiplexing (CP-OFDM) used for downlink communication of LTE and NR has a problem of large PAPR and difficulty in satisfying low PAPR required for the millimeter waves.

Therefore, the present disclosure proposes a mechanism that can satisfy a PAPR requirement in downlink communication.

Solution to Problem

According to the present disclosure, a terminal device is provided. A terminal device includes a control unit. The control unit acquires, from a base station apparatus, information about a signal waveform for use, of a plurality of signal waveforms including a single carrier signal, the signal waveform for use being used for downlink communication with the base station apparatus, the information being transmitted by using a predetermined signal waveform of the plurality of signal waveforms. The control unit performs the downlink communication with the base station apparatus by using the signal waveform for use, on the basis of the information.

BRIEF DESCRIPTION OF DRAWINGS

FIG. 6 is a block diagram illustrating a configuration example of a terminal device according to the embodiment of the present disclosure.

FIG. 18 is a block diagram illustrating an example of a schematic configuration of a car navigation device to which a technology according to the present disclosure is applicable.

DESCRIPTION OF EMBODIMENTS

Figure 1:
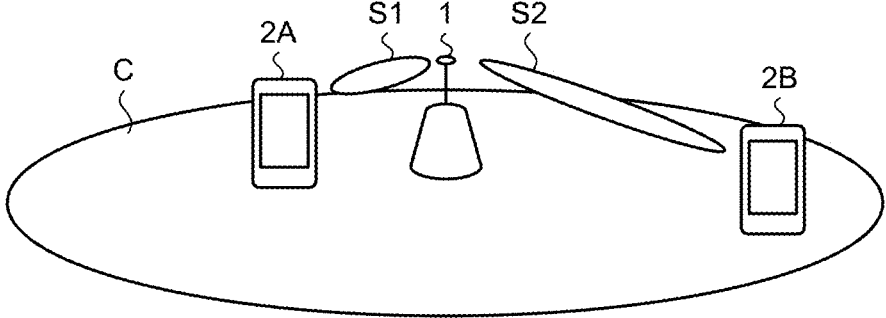
FIG. 1 is a diagram for illustrating an overview of a communication system according to an embodiment of the present disclosure.

Preferred embodiments of the present disclosure will be described in detail below with reference to the accompanying drawings. Note that in the present description and the drawings, component elements having substantially the same functional configurations are designated by the same reference numerals, and redundant description thereof will be omitted.

Furthermore, in the present description and the drawings, a plurality of component elements having substantially the same functional configurations will be distinguished by giving the same reference numerals followed by different alphabets in some cases. For example, a plurality of configurations having substantially the same functional configuration is distinguished as necessary, such as terminal device 2A and terminal device 2B. However, in a case where there is no need to particularly distinguish the plurality of component elements having substantially the same functional configuration, the component elements are denoted by only the same reference numeral. For example, when it is not necessary to particularly distinguish the terminal device 2A and the terminal device 2B from each other, the terminal devices are simply referred to as terminal devices 2.

Note that the description will be given in the following order.

1. Introduction
2. Embodiment
2.1. Overview of communication system
2.2 Configuration of communication system
2.2.1. Configuration example of base station apparatus
2.2.2. Configuration example of terminal device
2.3. Processing by communication system
2.3.1. Communication process
2.3.2. Signal waveform switching process by base station apparatus
2.3.3. Notification processing for signal waveform for use
2.3.4. Communication process according to signal waveform for use
3. Application examples
3.1. Application example for base station
3.2. Application example for terminal device
4. Other embodiments
5. Supplementary notes

1. INTRODUCTION

In recent years, due to a wireless environment in which various wireless systems are mixed and an increase and diversification of a content amount transmitted wirelessly, depletion of radio resources (frequencies) that can be allocated to the wireless systems have become a problem. Under such circumstances, in order to obtain available radio wave resources, an operation using millimeter wave that is a frequency band further readily ensured, particularly, an operation using millimeter wave being a frequency band of 52.6 GHz to 110 GHz has been considered.

Examples of use cases of millimeter wave communication include the followings.

High data RATe eMBB

Mobile data offloading

Short-range high data RATe D2D communications

Vertical industry factory application

Broadband distribution network

IntegRATed access backhaul (IAB)

Factory automation/Industrial IoT (IIoT)

Augmented reality/virtual reality headsets and other high-end wearables

Intelligent Transport System (ITS) and V2X

Data center inter-rack connectivity

Smart grid automation

Radar/positioning

In this way, in the millimeter wave communication, a signal waveform having low Peak to Average Power RATio (PAPR) is required, due to the problem of non-linearity of a power amplifier (PA). In particular, in downlink communication transmitting a signal from a base station apparatus to a terminal device, communication with large transmission power such as multicast communication is performed. Therefore, downlink communication using millimeter wave tends to be affected by the non-linearity of the power amplifier, and a signal waveform having low PAPR is required.

As a signal that has a signal waveform with low PAPR, there is known a single carrier signal. Using the single carrier signal for millimeter wave wireless communication achieves low PAPR.

Meanwhile, from the viewpoint of frequency utilization efficiency and commonality to FR1/FR2, it is desired to use a multicarrier signal also in downlink communication in a millimeter wave band. For example, the multicarrier signal has the following advantages as compared with the single carrier signal.

Easy to separate from multipath

Easy to perform digital precoding for each frequency

Easy to perform Non-contiguous allocation of resources on frequency axis

The ease of separation from multipath affects, in particular, the number of multiplexing in MIMO. Easier separation of the multicarrier signal from the multipath makes it possible to increase the number of multiplexing in MIMO, as compared with the single carrier signal.

The base station apparatus is connected to a plurality of terminal devices, and therefore, improvement of the frequency utilization efficiency is demanded even in the millimeter wave band. As described above, in the downlink communication in the millimeter wave band, the low PAPR and an improvement in efficiency of the entire system are demanded.

2. EMBODIMENT

<2.1. Overview of Communication System>

Therefore, in the technology of the present disclosure, downlink communication is performed using one of a plurality of signal waveforms including a single carrier signal in order to achieve the low PAPR and the improvement in efficiency of the entire system. The overview of the technology of the present disclosure will be described with reference to FIG. 1.

FIG. 1 is a diagram for illustrating an overview of a communication system according to an embodiment of the present disclosure. As illustrated in FIG. 1, the communication system according to the present embodiment includes a base station apparatus 1 and a plurality of terminal devices 2A and 2B.

The base station apparatus 1 determines a signal waveform to be used for the downlink communication with each of the terminal devices 2, from the plurality of signal waveforms including the single carrier signal. For example, the base station apparatus 1 determines to use either the single carrier signal or a multicarrier signal for the downlink communication.

Here, the multicarrier signal is, for example, CP-OFDM. Furthermore, examples of the single carrier signal include DFT-S-OFDM, SC-QAM, Single carrier with zero padding/unique word, and the like.

For example, the base station apparatus 1 determines the signal waveform to be used, for each terminal device 2, and notifies the terminal device 2 of information about the determined signal waveform. The base station apparatus 1 performs the downlink communication with the terminal device 2 by using the signal waveform that the base station apparatus 1 has notified of.

In the example of FIG. 1, the base station apparatus 1 selects the multicarrier signal and performs downlink communication S1 with the terminal device 2A positioned near the center of a cell C. Furthermore, the base station apparatus 1 selects the single carrier signal and performs downlink communication S2 with the terminal device 2B positioned near an edge of the cell C.

In order to perform the downlink communication with the terminal device 2B positioned near the cell edge, a larger transmission power is required, and thus the low PAPR is required. On the other hand, the required transmission power for the terminal device 2A positioned near the center of the cell C is smaller than that for the terminal device 2B positioned near the cell edge, and thus, the transmission power required can be easily secured even if the PAPR is high.

Therefore, the base station apparatus 1 selects the multicarrier signal for the terminal device 2A positioned near the center of the cell C, and selects the single carrier signal for the terminal device 2B positioned near the edge of the cell C.

As described above, the base station apparatus 1 allocates the single carrier signal to the downlink communication in which the low PAPR is severely required, and allocates the signal waveform of a signal other than the single carrier signal (here, the multicarrier signal) to the downlink communication in which the low PAPR is not so severely required. Accordingly, the base station apparatus 1 can achieve the low PAPR and the improvement in efficiency of the entire system.

Note that, although determination of the signal waveform according to the position of the terminal device 2 in the cell C by the base station apparatus 1 has been described here, the method of determining the signal waveform by the base station apparatus 1 is not limited thereto. Details of the method of determining the signal waveform by the base station apparatus 1 will be described later.

<2.2. Configuration Example of Communication System>

A configuration example of the communication system according to the embodiment of the present disclosure will be described. As described above, the communication system according to the present embodiment includes the base station apparatus 1 and the terminal devices 2.

<2.2.1. Configuration Example of Base Station Apparatus>

Figure 2:
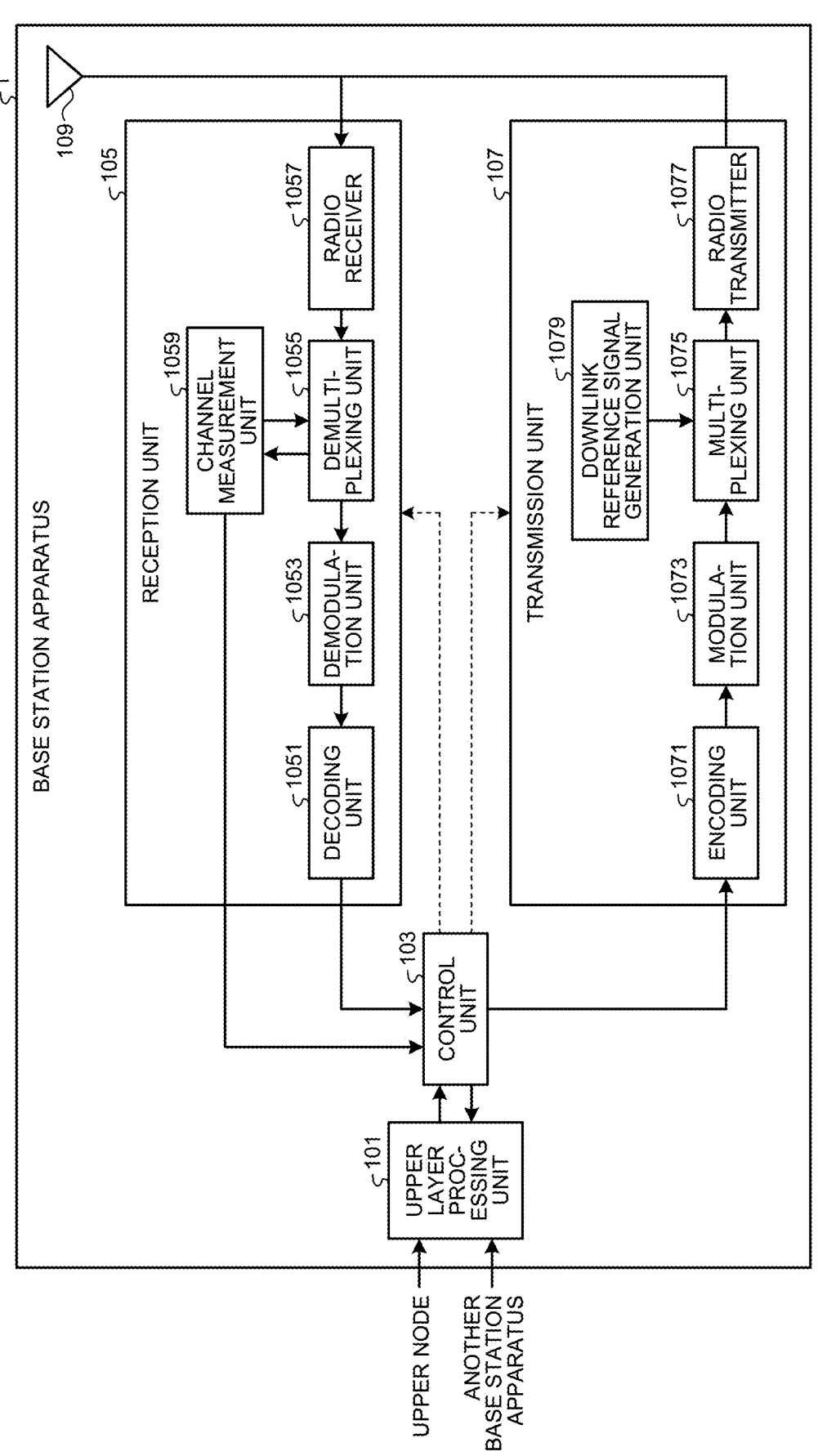
FIG. 2 is a block diagram illustrating a configuration example of a base station apparatus according to the embodiment of the present disclosure.

FIG. 2 is a block diagram illustrating a configuration example of the base station apparatus 1 according to an embodiment of the present disclosure. As illustrated in FIG. 2, the base station apparatus 1 includes an upper layer processing unit 101, a control unit 103, a reception unit 105, a transmission unit 107, and a transmission/reception antenna 109.

The base station apparatus 1 can be configured to support one or more Radio Access Technologies (RATs). For example, the base station apparatus 1 is configured to support both LTE and NR. In this configuration, some or all of the units included in the base station apparatus 1 can be individually configured according to the RATs. For example, the reception unit 105 and the transmission unit 107 are individually configured according to LTE and NR. Furthermore, in the NR cell, some or all of the units included in the base station apparatus 1 illustrated in FIG. 2 can be individually configured according to a parameter set related to a transmission signal. For example, in a certain NR cell, a radio receiver 1057 and a radio transmitter 1077 can be individually configured according to the parameter set related to the transmission signal.

(Upper Layer Processing Unit)

The upper layer processing unit 101 outputs downlink data (transport block) to the control unit 103. The upper layer processing unit 101 performs processing of a Medium Access Control (MAC) layer, a Packet Data Convergence Protocol (PDCP) layer, a radio link control (RLC) layer, and a Radio Resource Control (RRC) layer. In addition, the upper layer processing unit 101 generates control information to control the reception unit 105 and the transmission unit 107, and outputs the control information to the control unit 103.

The upper layer processing unit 101 performs processing and management related to RAT control, radio resource control, subframe setting, scheduling control, and/or CSI report control. The processing and management in the upper layer processing unit 101 are performed for each terminal device or commonly for the terminal devices connected to the base station apparatus. The processing and management in the upper layer processing unit 101 may be performed only by the upper layer processing unit 101 or may be acquired from an upper node or another base station apparatus. Furthermore, the processing and management in the upper layer processing unit 101 may be individually performed according to the RATs. For example, the upper layer processing unit 101 individually performs processing and management according to LTE and processing and management according to NR.

In the RAT control in the upper layer processing unit 101, management related to the RATs is performed. For example, in the RAT control, management for LTE and/or management for NR is performed. The management for NR includes setting and processing of the parameter set related to the transmission signal in the NR cell.

In the radio resource control in the upper layer processing unit 101, management of setting information in the base station apparatus is managed. In the radio resource control in the upper layer processing unit 101, generation and/or management of the downlink data (transport block), system information, an RRC message (RRC parameter), and/or MAC Control Element (CE) is performed.

In the subframe setting in the upper layer processing unit 101, management of subframe setting, subframe pattern setting, uplink downlink setting, uplink reference UL-DL setting, and/or downlink reference UL-DL setting is performed. Note that the subframe setting in the upper layer processing unit 101 is also referred to as base station subframe setting. In addition, the subframe setting in the upper layer processing unit 101 can be determined on the basis of an uplink traffic and a downlink traffic. Furthermore, the subframe setting in the upper layer processing unit 101 can be determined on the basis of a scheduling result of the scheduling control in the upper layer processing unit 101.

In the scheduling control in the upper layer processing unit 101, a frequency and subframe to which a physical channel is allocated, a code rate, a modulation method, the transmission power, and the like of the physical channel are determined, on the basis of channel state information received, an estimation value of a propagation channel, channel quality, and the like input from a channel measurement unit 1059. For example, the control unit 103 generates the control information (DCI format) on the basis of the scheduling result of the scheduling control in the upper layer processing unit 101.

In the CSI report control in the upper layer processing unit 101, the CSI report from each terminal device 2 is controlled. For example, setting related to a CSI reference resource to be assumed for calculation of CSI in the terminal device 2 is controlled.

(Control Unit)

The control unit 103 controls the reception unit 105 and the transmission unit 107 on the basis of the control information from the upper layer processing unit 101. The control unit 103 generates the control information for the upper layer processing unit 101 and outputs the control information to the upper layer processing unit 101. The control unit 103 receives an input of a decoded signal from a decoding unit 1051 and an input of a channel estimation result from the channel measurement unit 1059. The control unit 103 outputs a signal to be encoded to an encoding unit 1071. Furthermore, the control unit 103 is used to control the whole or part of the base station apparatus 1.

In addition, the control unit 103 determines the signal waveform (hereinafter, also referred to as signal waveform for use) to be used for downlink communication with each terminal device 2, from the single carrier signal and the multicarrier signal. The control unit 103 controls the transmission unit 107 to notify the terminal device 2 of information about the signal waveform for use, by using a predetermined signal waveform (e.g., the single carrier signal). Furthermore, the control unit 103 controls the transmission unit 107, and performs the downlink communication with the terminal device 2 by using the signal waveform for use that has been notified of. Note that processing performed by the control unit 103 will be described in detail later.

(Reception Unit)

The reception unit 105, under the control of the control unit 103, receives a signal transmitted from the terminal device 2 via the transmission/reception antenna 109, further performs reception processing such as separation, demodulation, and decoding, and outputs information subjected to the reception processing to the control unit 103. Note that the reception processing in the reception unit 105 is performed on the basis of setting defined in advance or setting that the terminal device 2 is notified of by the base station apparatus 1. The reception unit 105 includes the decoding unit 1051, a demodulation unit 1053, a demultiplexing unit 1055, the radio receiver 1057, and the channel measurement unit 1059.

(Radio Receiver)

The radio receiver 1057 performs, on an uplink signal received via the transmission/reception antenna 109, conversion (down conversion) into an intermediate frequency, removal of an unnecessary frequency component, control of an amplification level to maintain an appropriate signal level, quadrature demodulation based on an in-phase component and a quadrature component of the received signal, conversion from an analog signal into a digital signal, removal of a Guard Interval (GI), and/or extraction of a frequency domain signal by Fast Fourier Transform (FFT).

(Demultiplexing Unit)

The demultiplexing unit 1055 separates an uplink channel such as PUCCH or PUSCH and/or an uplink reference signal, from a signal input from the radio receiver 1057. The demultiplexing unit 1055 outputs the uplink reference signal to the channel measurement unit 1059. The demultiplexing unit 1055 performs compensation of the propagation channel for the uplink channel, on the basis of the estimation value of the propagation channel input from the channel measurement unit 1059.

(Demodulation Unit)

The demodulation unit 1053 performs, on a modulation symbol from the uplink channel, demodulation of the received signal by using a modulation method such as Binary Phase Shift Keying (BPSK), $\pi/2$ BPSK, Quadrature Phase shift Keying (QPSK), Quadrature Amplitude Modulation (16QAM), 64QAM, or 256QAM. The demodulation unit 1053 performs separation and demodulation on an uplink channel multiplexed in MIMO.

(Decoding Unit)

The decoding unit 1051 performs decode processing on encoded bits demodulated in the uplink channel. Decoded uplink data and uplink control information are output to the control unit 103. The decoding unit 1051 performs decode processing on PUSCH for each transport block.

(Channel Measurement Unit)

The channel measurement unit 1059 measures the estimation value of the propagation channel and/or the quality of a channel, on the basis of the uplink reference signal input from the demultiplexing unit 1055, and outputs the estimation value and/or the channel quality to the demultiplexing unit 1055 and/or the control unit 103. For example, the channel measurement unit 1059 measures the estimation value of the propagation channel for propagation channel compensation on PUCCH or PUSCH by using UL-DMRS, and measures the channel quality in the uplink by using SRS.

(Transmission Unit)

The transmission unit 107, under the control of the control unit 103, performs transmission processing such as encoding, modulation, and multiplexing, on downlink control information and the downlink data that are input from the upper layer processing unit 101. For example, the transmission unit 107 multiplexes generated PHICH, PDCCH, EPDCCH, PDSCH, and downlink reference signal to generate the transmission signal. Note that the transmission processing in the transmission unit 107 is performed, on the basis of the setting defined in advance, the setting that the terminal device 2 is notified of by the base station apparatus 1, or setting notified of through the PDCCH or EPDCCH transmitted in the same subframe. The transmission unit 107 includes the encoding unit 1071, a modulation unit 1073, a multiplexing unit 1075, the radio transmitter 1077, and a downlink reference signal generation unit 1079.

(Encoding Unit)

The encoding unit 1071 performs encoding of an HARQ indicator (HARQ-ACK), the downlink control information, and the downlink data that are input from the control unit 103, by using a predetermined encoding method such as block coding, convolutional coding, or turbo coding. The modulation unit 1073 modulates encoded bits that are input from the encoding unit 1071 by using a predetermined modulation method such as BPSK, $\pi/2$ BPSK, QPSK, 16QAM, 64QAM, or 256QAM. The downlink reference signal generation unit 1079 generates the downlink reference signal on the basis of Physical cell identification (PCI), the RRC parameter set in the terminal device 2, and the like.

(Multiplexing Unit)

The multiplexing unit 1075 multiplexes the modulation symbols and the downlink reference signals in each channel, and arranges the modulation symbols and the downlink reference signals in a predetermined resource element.

(Radio Transmitter)

The radio transmitter 1077 performs, on the signal from the multiplexing unit 1075, processing such as conversion into a signal in a time domain by Inverse Fast Fourier Transform (IFFT), addition of the guard interval, generation of a baseband digital signal, conversion into an analog signal, quadrature modulation, conversion from a signal having the intermediate frequency to a signal having a high frequency (up conversion), removal of an unnecessary frequency component, and amplification of power, and generates the transmission signal. The transmission signal output from the radio transmitter 1077 is transmitted from the transmission/reception antenna 109.

Here, the radio transmitter 1077 according to the present embodiment is configured to support a plurality of downlink signal waveforms. The radio transmitter 1077 in the base station apparatus 1 that supports both of a first signal waveform (the multicarrier signal) and a second signal waveform (the single carrier signal) will be described in detail with reference to FIGS. 3 to 5.

Figure 3:
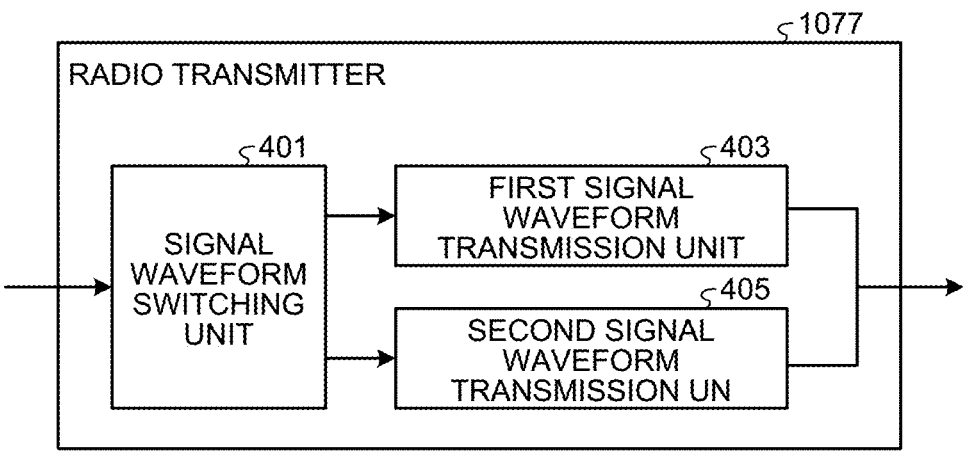
FIG. 3 is a block diagram illustrating a configuration example of a radio transmitter.

FIG. 3 is a block diagram illustrating a configuration example of the radio transmitter 1077. The radio transmitter 1077 includes a signal waveform switching unit 401, a first signal waveform transmission unit 403, and a second signal waveform transmission unit 405.

The signal waveform switching unit 401 is configured to switch the signal waveforms in the downlink communication for transmission, between the first signal waveform and the second signal waveform, according to a predetermined condition or situation. In a case where the downlink communication for transmission uses the first signal waveform, the downlink communication is subjected to transmission processing by the first signal waveform transmission unit 403. In a case where the downlink communication for transmission uses the second signal waveform, the downlink communication is subjected to transmission processing by the second signal waveform transmission unit 405. A switching condition and situation in the signal waveform switching unit 401 will be described later. Note that the signal waveform switching unit is also referred to as a signal waveform control unit. Furthermore, in FIG. 3, the first signal waveform transmission unit 403 and the second signal waveform transmission unit 405 are illustrated as different processing units, but the first and second signal waveform transmission units 403 and 405 may be configured as one processing unit so that the transmission processing is only partially switched.

Figure 4:
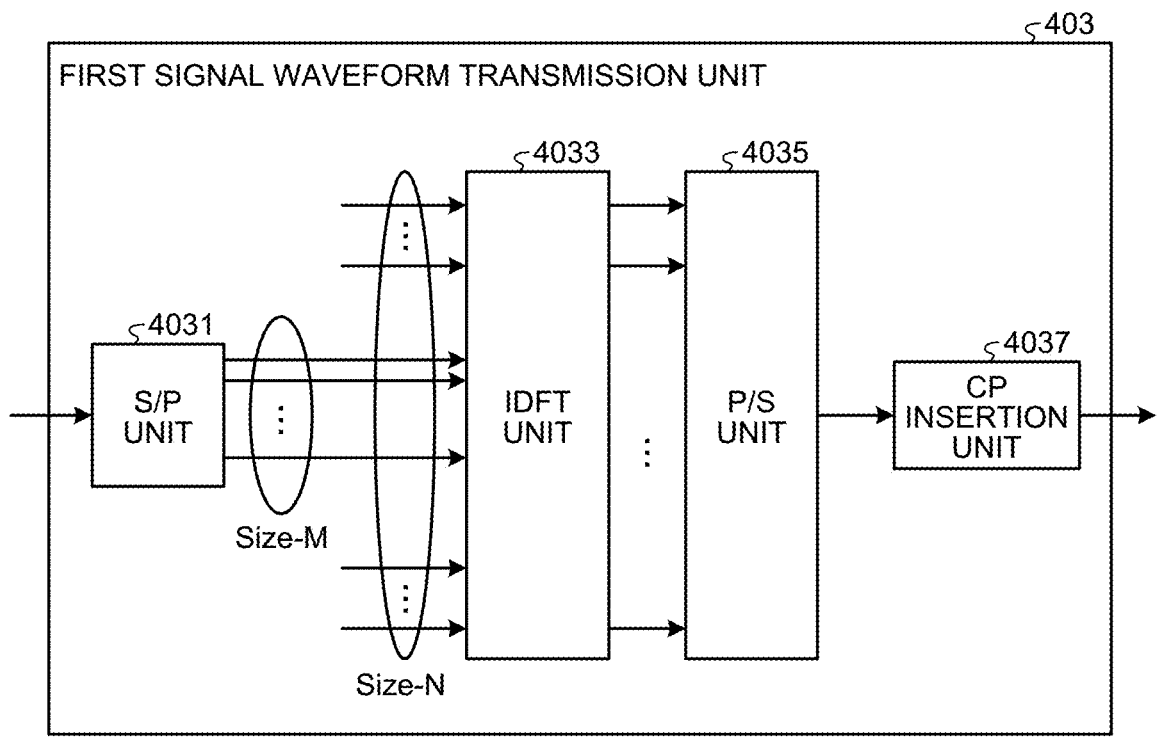
FIG. 4 is a block diagram illustrating a configuration example of a first signal waveform transmission unit.

FIG. 4 is a block diagram illustrating a configuration example of the first signal waveform transmission unit 403. The first signal waveform transmission unit 403 transmits a downlink channel and signal to be transmitted by using CP-OFDM, as the signal waveform for uplink communication. The first signal waveform transmission unit 403 includes an S/P unit 4031, an Inverse Discrete Fourier Transform (IDFT) unit 4033, a P/S unit 4035, and a CP insertion unit 4037.

The S/P unit 4031 converts an input serial signal into a parallel signal of size M. Here, the size M is determined depending on the size of resource in the frequency domain used for the downlink communication. The parallel signal of size M is input to the IDFT unit 4033 so as to correspond to a predetermined frequency domain.

The IDFT unit 4033 performs inverse Fourier transform processing on a parallel signal of size N. Here, in the Fourier transform processing in a case where the size N is a power of 2, Inverse Fast Fourier Transform (IFFT) processing can be performed. The P/S unit 4035 converts the parallel signal of size N into a serial signal. The CP insertion unit 4037 inserts a predetermined CP for each OFDM symbol.

Figure 5:
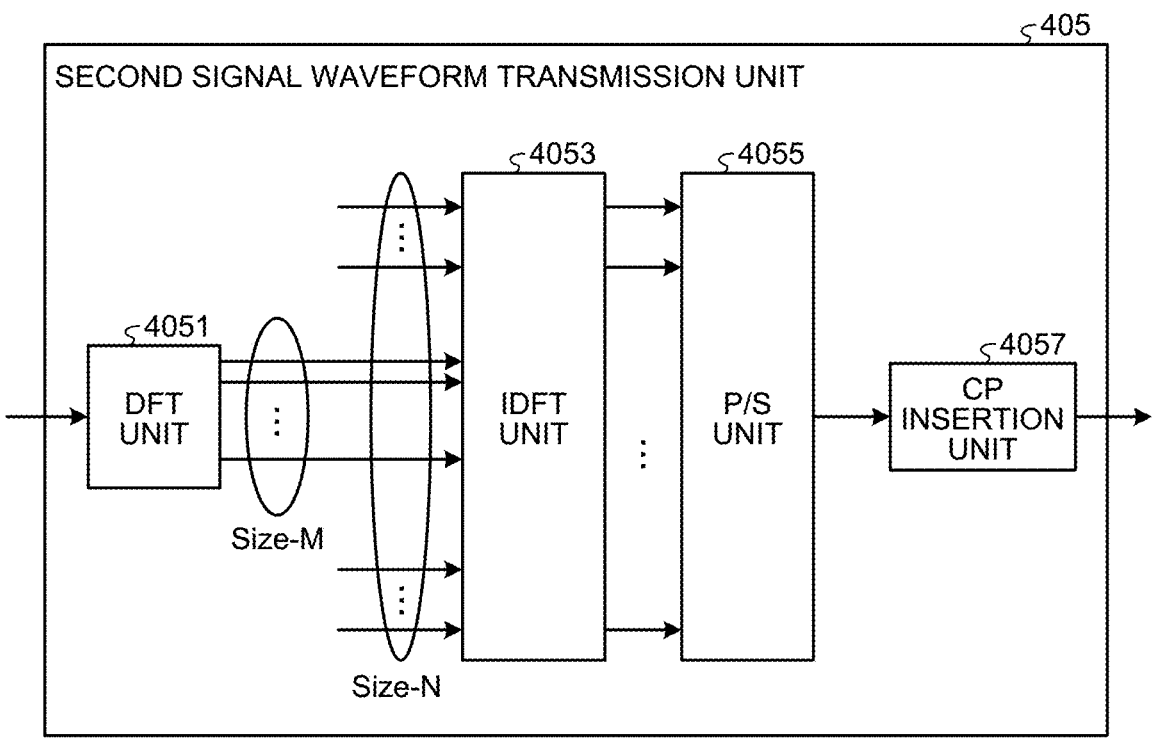
FIG. 5 is a block diagram illustrating a configuration example of a second signal waveform transmission unit.

FIG. 5 is a block diagram illustrating a configuration example of the second signal waveform transmission unit 405. The second signal waveform transmission unit 405 transmits the downlink channel and signal to be transmitted by using, for example, SC-FDMA, as the signal waveform for downlink communication. The second signal waveform transmission unit 405 includes a DFT unit 4051, an inverse discrete Fourier transform (IDFT) unit 4053, a P/S unit 4055, and a CP insertion unit 4057. The DFT unit 4051 performs DFT conversion into a parallel signal of size M. Here, the size M is determined depending on the size of resource in the frequency domain used for the downlink communication. The parallel signal of size M is input to the IDFT unit 4053 so as to correspond to a predetermined frequency domain. The IDFT unit 4053 performs inverse Fourier transform processing on the parallel signal of size N. Here, in the Fourier transform processing in a case where the size N is a power of 2, Inverse Fast Fourier Transform (IFFT) processing can be performed. The P/S unit 4055 converts the parallel signal of size N into a serial signal. The CP insertion unit 4057 inserts a predetermined CP for each SC-FDMA symbol.

<2.2.2. Configuration Example of Terminal Device>

Figure 6:
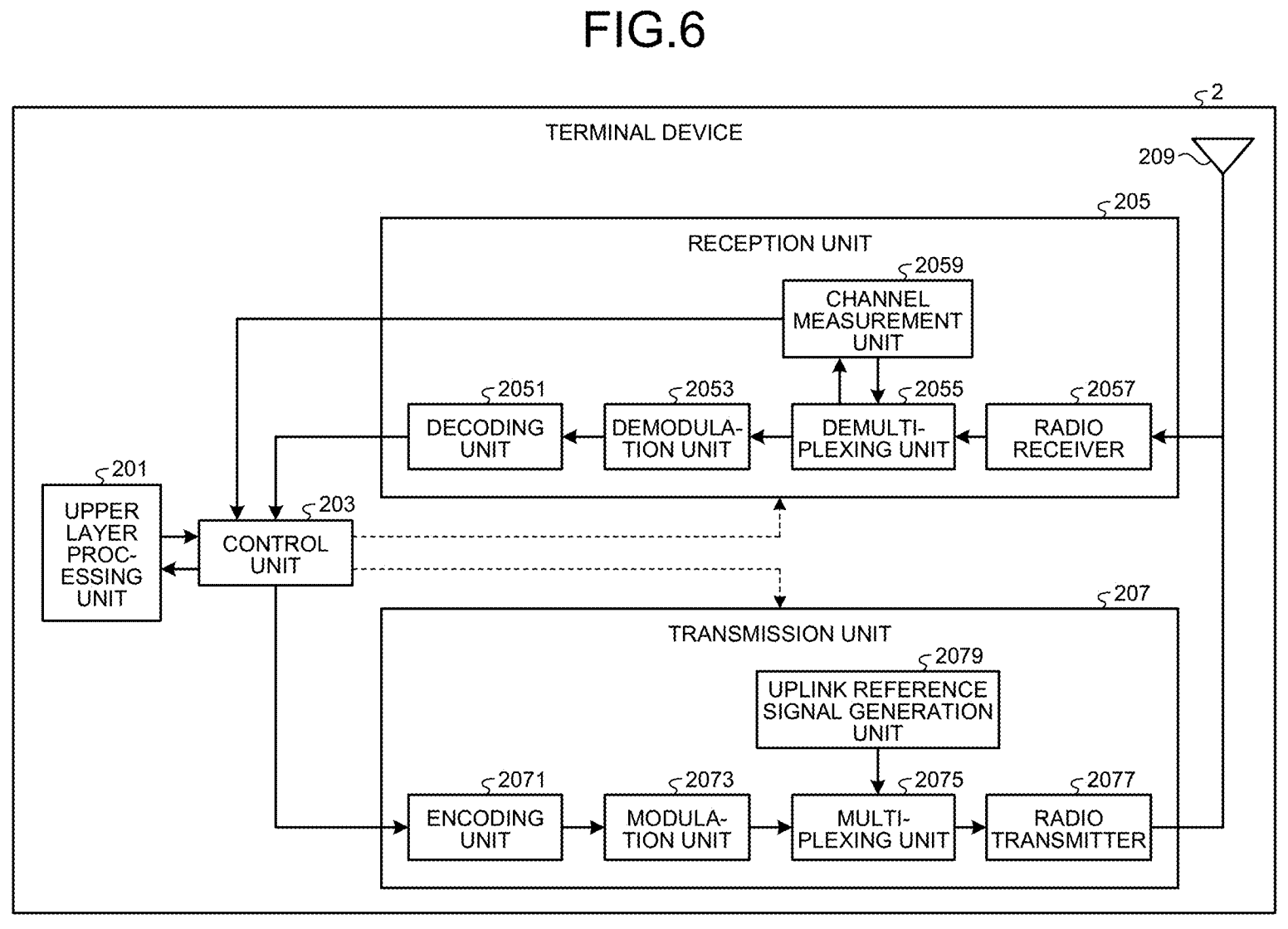

FIG. 6 is a block diagram illustrating a configuration example of each terminal device 2 according to an embodiment of the present disclosure. As illustrated in FIG. 6, the terminal device 2 includes an upper layer processing unit 201, a control unit 203, a reception unit 205, a transmission unit 207, and a transmission/reception antenna 209.

The terminal device 2 is configured to support one or more Radio Access Technologies (RATs). For example, the terminal device 2 is configured to support both LTE and NR. In this configuration, some or all of the units included in the terminal device 2 can be individually configured according to the RATs. For example, the reception unit 205 and the transmission unit 207 are individually configured according to LTE and NR. Furthermore, in the NR cell, some or all of the units included in the terminal device 2 illustrated in FIG. 6 can be individually configured according to a parameter set related to a transmission signal. For example, in a certain NR cell, a radio receiver 2057 and a radio transmitter 2077 can be individually configured according to the parameter set related to the transmission signal.

(Upper Layer Processing Unit)

The upper layer processing unit 201 outputs uplink data (transport block) to the control unit 203. The upper layer processing unit 201 performs processing of a Medium Access Control (MAC) layer, a Packet Data Convergence Protocol (PDCP) layer, a Radio Link Control (RLC) layer, and a Radio Resource Control (RRC) layer. In addition, the upper layer processing unit 201 generates control information to control the reception unit 205 and the transmission unit 207, and outputs the control information to the control unit 203.

The upper layer processing unit 201 performs processing and management related to RAT control, radio resource control, subframe setting, scheduling control, and/or CSI report control. The processing and management in the upper layer processing unit 201 are performed on the basis of setting defined in advance and/or setting based on the control information set or notified of by the base station apparatus 1. For example, the control information from the base station apparatus 1 includes the RRC parameter, the MAC control element, or the DCI. Furthermore, the processing and management in the upper layer processing unit 201 may be individually performed according to the RATs. For example, the upper layer processing unit 201 individually performs processing and management according to LTE and processing and management according to NR.

In the RAT control in the upper layer processing unit 201, management related to the RAT is performed. For example, in the RAT control, management for LTE and/or management for NR is performed. The management for NR includes setting and processing of the parameter set related to the transmission signal in the NR cell.

In the radio resource control in the upper layer processing unit 201, management of setting information in the terminal device is managed. In the radio resource control in the upper layer processing unit 201, generation and/or management of the uplink data (transport block), system information, an RRC message (RRC parameter), and/or MAC Control Element (CE) is performed In the subframe setting in the upper layer processing unit 201, subframe setting in the base station apparatus 1 and/or a base station apparatus different from the base station apparatus 1 is managed. The subframe setting includes uplink or downlink setting for a subframe, subframe pattern setting, uplink downlink setting, uplink reference UL-DL setting, and/or downlink reference UL-DL setting. Note that the subframe setting in the upper layer processing unit 201 is also referred to as terminal subframe setting.

In the scheduling control in the upper layer processing unit 201, the control information for control related to scheduling of the reception unit 205 and the transmission unit 207 is generated on the basis of the DCI (scheduling information) from the base station apparatus 1.

In the CSI report control in the upper layer processing unit 201, control related to the CSI report to the base station apparatus 1 is performed. For example, in the CSI report control, setting related to the CSI reference resource to be assumed for calculation of CSI in a channel measurement unit 2059 is controlled. In the CSI report control, a resource (timing) used to report CSI is controlled on the basis of the DCI and/or the RRC parameter.

(Control Unit)

The control unit 203 controls the reception unit 205 and the transmission unit 207 on the basis of the control information from the upper layer processing unit 201. The control unit 203 generates the control information for the upper layer processing unit 201 and outputs the control information to the upper layer processing unit 201. The control unit 203 receives an input of a decoded signal from a decoding unit 2051 and an input of a channel estimation result from the channel measurement unit 2059. The control unit 203 outputs a signal to be encoded to an encoding unit 2071. Furthermore, the control unit 203 may be used to control the whole or part of the terminal device 2.

In addition, the control unit 203 acquires, from the base station apparatus 1 via the reception unit 205, the information about the signal waveform for use that is used for downlink communication with the base station apparatus 1, that is, the single carrier signal or the multicarrier signal. Note that the information about the signal waveform for use is information transmitted with a predetermined signal waveform (e.g., the single carrier signal). The control unit 203 controls the reception unit 205, and performs the downlink communication with the base station apparatus 1 by using the signal waveform for use.

(Reception Unit)

The reception unit 205, under the control of the control unit 203, receives a signal transmitted from the base station apparatus 1 via the transmission/reception antenna 209, further performs reception processing such as separation, demodulation, and decoding, and outputs information subjected to the reception processing to the control unit 203. Note that the reception processing in the reception unit 205 is performed on the basis of setting defined in advance or a notification or setting from the base station apparatus 1. The reception unit 205 includes the decoding unit 2051, a demodulation unit 2053, a demultiplexing unit 2055, the radio receiver 2057, and the channel measurement unit 2059.

(Radio Receiver)

The radio receiver 2057 performs, on an uplink signal received via the transmission/reception antenna 209, conversion (down conversion) into an intermediate frequency, removal of an unnecessary frequency component, control of an amplification level to maintain an appropriate signal level, quadrature demodulation based on an in-phase component and a quadrature component of the received signal, conversion from an analog signal into a digital signal, removal of a Guard Interval (GI), and/or extraction of a frequency domain signal by Fast Fourier Transform (FFT).

Here, the radio receiver 2057 according to the present embodiment is configured to support a plurality of uplink signal waveforms. The radio receiver 2057 in the terminal device 2 that supports both of the first signal waveform (the multicarrier signal) and the second signal waveform (the single carrier signal) will be described in detail with reference to with reference to FIGS. 7 to 9.

Figure 7:
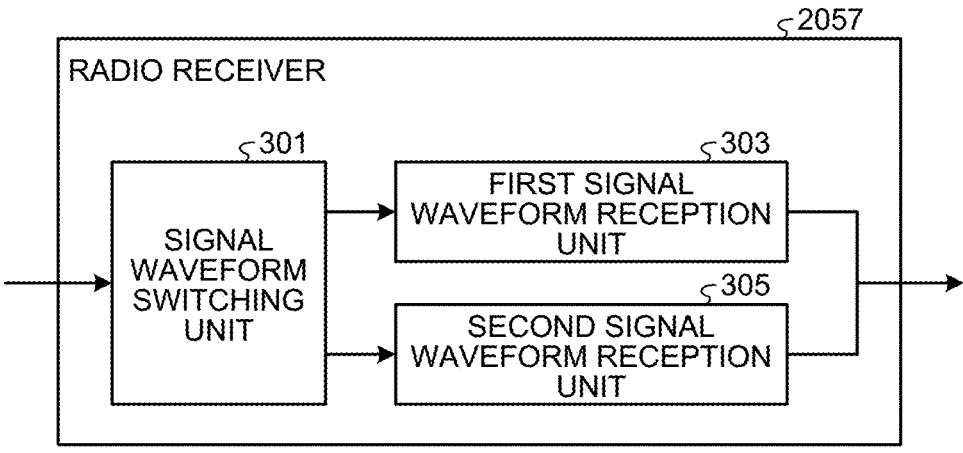
FIG. 7 is a block diagram illustrating a configuration example of a radio receiver.

FIG. 7 is a block diagram illustrating a configuration example of the radio receiver 2057. The radio receiver 2057 includes a signal waveform switching unit 301, a first signal waveform reception unit 303, and a second signal waveform reception unit 305.

The signal waveform switching unit 301 is configured to be switched depending on whether the received downlink communication uses the first signal waveform or the second signal waveform, according to a predetermined condition or situation. In a case where the received downlink communication uses the first signal waveform, the downlink communication is subjected to reception processing by the first signal waveform reception unit 303. In a case where the received downlink communication uses the second signal waveform, the downlink communication is subjected to reception processing by the second signal waveform reception unit 305. A switching condition and situation in the signal waveform switching unit 301 will be described later. Note that the signal waveform switching unit is also referred to as a signal waveform control unit. Furthermore, in FIG. 7, the first signal waveform reception unit 303 and the second signal waveform reception unit 305 are illustrated as different processing units, but the first and second signal waveform reception units 303 and 305 may be configured as one processing unit so that the reception processing is only partially switched.

Figure 8:
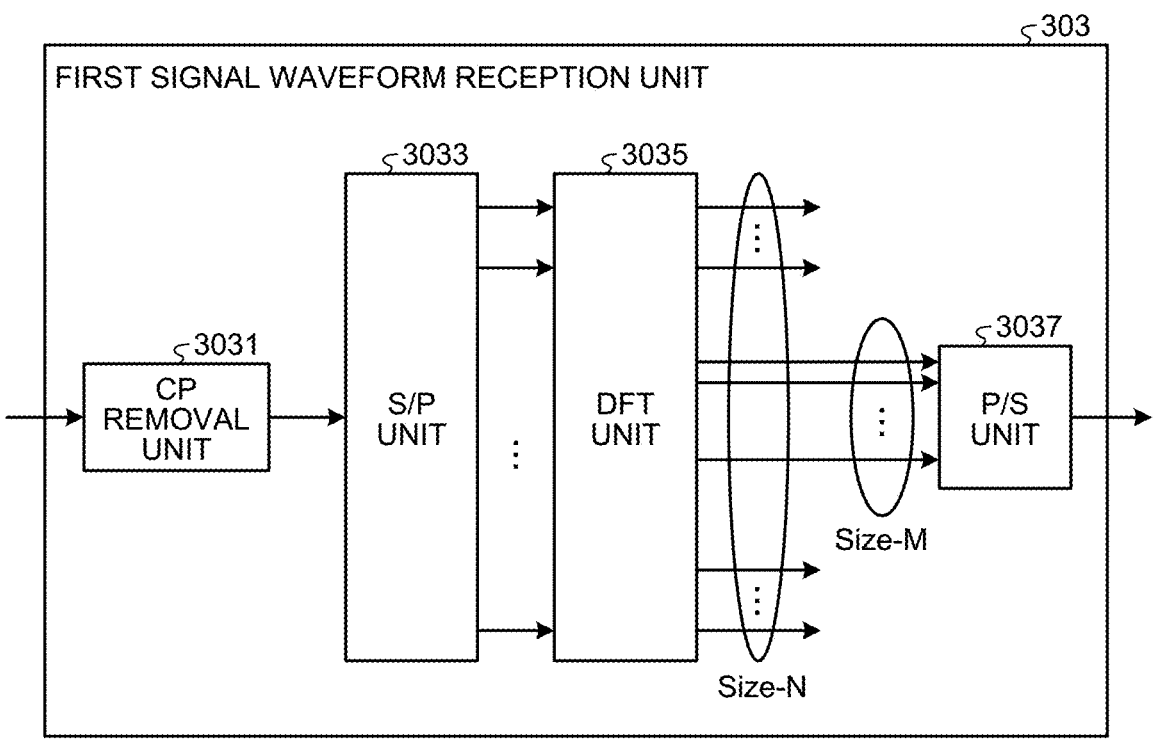
FIG. 8 is a block diagram illustrating a configuration example of a first signal waveform reception unit.

FIG. 8 is a block diagram illustrating a configuration example of the first signal waveform reception unit 303. The first signal waveform reception unit 303 performs the reception processing for the downlink channel and signal transmitted by using CP-OFDM, as the signal waveform for downlink communication. The first signal waveform reception unit 303 includes a CP removal unit 3031, an S/P unit 3033, a discrete Fourier transform (DFT) unit 3035, and a P/S unit 3037.

The CP removal unit 3031 removes the Cyclic prefix (CP) added in the received downlink communication. The S/P unit 3033 converts the input serial signal into the parallel signal of size N. The DFT unit 3035 performs Fourier transform processing. Here, in the Fourier transform processing in a case where the size N is a power of 2, Fast Fourier Transform (FFT) processing can be performed. The P/S unit 3037 converts the input parallel signal of size M into the serial signal. Here, the downlink communication signal transmitted by the terminal device 2 that performs the reception processing is input to the P/S unit 3037. In addition, the size M is determined depending on the size of resource in the frequency domain used for the downlink communication.

Figure 9:
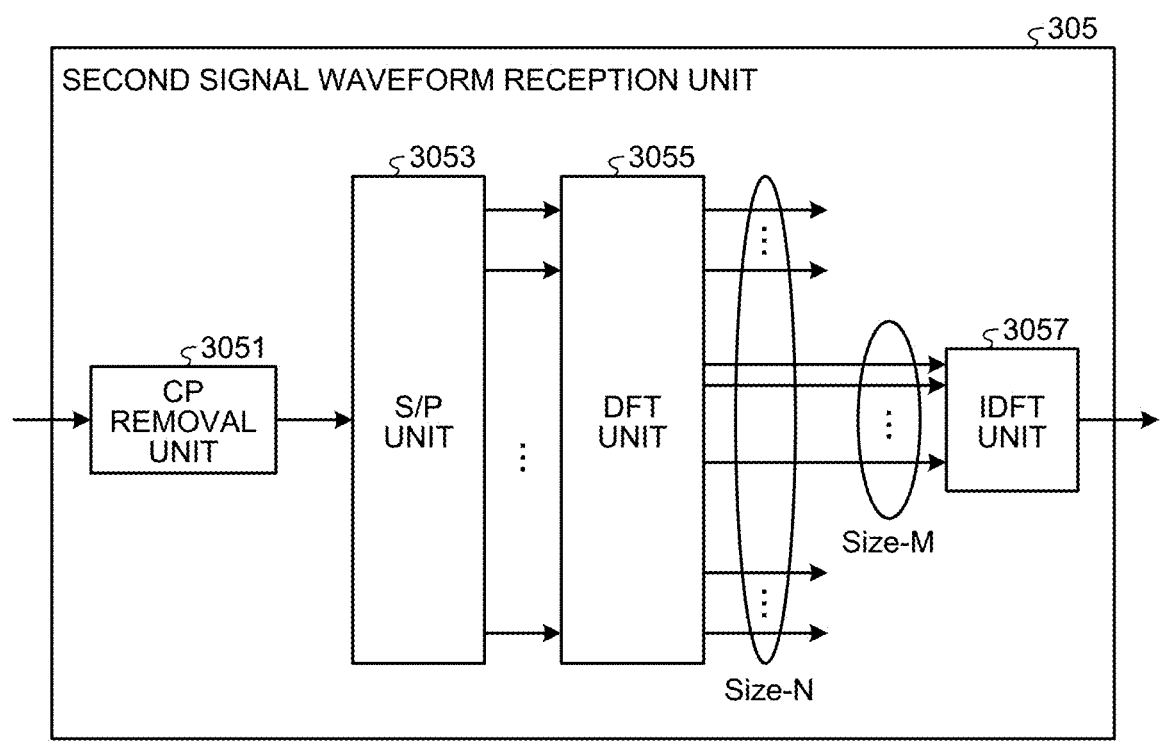
FIG. 9 is a block diagram illustrating a configuration example of a second signal waveform reception unit.

FIG. 9 is a block diagram illustrating a configuration example of the second signal waveform reception unit 305. The second signal waveform reception unit 305 receives the downlink channel and signal transmitted by using, for example, SC-FDMA, as the signal waveform for downlink communication. The second signal waveform reception unit 305 includes a CP removal unit 3051, an S/P unit 3053, a discrete Fourier transform (DFT) unit 3055, and an inverse discrete Fourier transform (IDFT) unit 3057.

The CP removal unit 3051 removes the Cyclic prefix (CP) added in the received downlink communication. The S/P unit 3053 converts the input serial signal into the parallel signal of size N. The DFT unit 3055 performs Fourier transform processing. Here, in the Fourier transform processing in a case where the size N is a power of 2, Fast Fourier Transform (FFT) processing can be performed. The IDFT unit 3057 performs inverse Fourier transform processing on the input signal of size M. Here, the downlink communication signal transmitted by the terminal device 2 that performs the reception processing is input to the IDFT 3057. In addition, the size M is determined depending on the size of resource in the frequency domain used for the downlink communication.

(Demultiplexing Unit)

Returning to FIG. 6, the demultiplexing unit 2055 separates a downlink channel such as PHICH, PDCCH, EPDCCH, or PDSCH, a downlink synchronization signal, and/or the downlink reference signal from the signal input from the radio receiver 2057. The demultiplexing unit 2055 outputs the downlink reference signal to the channel measurement unit 2059. The demultiplexing unit 2055 performs compensation of the propagation channel for the downlink channel, on the basis of the estimation value of the propagation channel input from the channel measurement unit 2059.

(Demodulation Unit)

The demodulation unit 2053 performs, on a modulation symbol from the downlink channel, demodulation of the received signal by using the modulation method such as BPSK, π/2 BPSK, QPSK, 16QAM, 64QAM, or 256QAM. The demodulation unit 2053 performs separation and demodulation on a downlink channel multiplexed in MIMO.

(Decoding Unit)

The decoding unit 2051 performs decode processing on encoded bits demodulated in the downlink channel. Decoded downlink data and downlink control information are output to the control unit 203. The decoding unit 2051 performs decode processing on PDSCH for each transport block.

(Channel Measurement Unit)

The channel measurement unit 2059 measures the estimation value of the propagation channel and/or the quality of a channel, on the basis of the downlink reference signal input from the demultiplexing unit 2055, and outputs the estimation value and/or the channel quality to the demultiplexing unit 2055 and/or the control unit 203. The downlink reference signal used for the measurement by the channel measurement unit 2059 may be determined on the basis of at least a transmission mode set by the RRC parameter, and/or another RRC parameter. For example, DL-DMRS measures the estimation value of the propagation channel for performing propagation channel compensation for PDSCH or EPDCCH. CRS measures the estimation value of the propagation channel for performing propagation channel compensation on PDCCH or PDSCH, and/or a channel in the downlink for reporting CSI. The CSI-RS measures the channel in the downlink for reporting CSI. The channel measurement unit 2059 calculates Reference Signal Received Power (RSRP) and/or Reference Signal Received Quality (RSRQ) on the basis of the CRS, CSI-RS, or a detection signal, and outputs the RSRP and/or RSRQ to the upper layer processing unit 201.

(Transmission Unit)

The transmission unit 207, under the control of the control unit 203, performs transmission processing such as encoding, modulation, and multiplexing, on uplink control information and the uplink data that are input from the upper layer processing unit 201. For example, the transmission unit 207 generates and multiplexes the uplink channel such as PUSCH or PUCCH, and/or the uplink reference signal, and generates the transmission signal. Note that the transmission processing in the transmission unit 207 is performed on the basis of setting defined in advance or setting or notification from the base station apparatus 1. The transmission unit 207 includes the encoding unit 2071, a modulation unit 2073, a multiplexing unit 2075, the radio transmitter 2077, and an uplink reference signal generation unit 2079.

(Encoding Unit)

The encoding unit 2071 performs encoding of an HARQ indicator (HARQ-ACK), the uplink control information, and the uplink data that are input from the control unit 203, by using a predetermined encoding method such as block coding, convolutional coding, or turbo coding. The modulation unit 2073 modulates encoded bits that are input from the encoding unit 2071 by using a predetermined modulation method such as BPSK, π/2 BPSK, QPSK, 16QAM, 64QAM, or 256QAM. The uplink reference signal generation unit 2079 generates the uplink reference signal on the basis of the RRC parameter or the like set in the terminal device 2.

(Multiplexing Unit)

The multiplexing unit 2075 multiplexes the modulation symbols and the uplink reference signals in each channel, and arranges the modulation symbols and the downlink reference signals in a predetermined resource element.

(Radio Transmitter)

The radio transmitter 2077 performs, on the signal from the multiplexing unit 2075, processing such as conversion into a signal in a time domain by Inverse Fast Fourier Transform (IFFT), addition of the guard interval, generation of a baseband digital signal, conversion into an analog signal, quadrature modulation, conversion from a signal having the intermediate frequency to a signal having a high frequency (up conversion), removal of an unnecessary frequency component, and amplification of power, and generates the transmission signal. The transmission signal output from the radio transmitter 2077 is transmitted from the transmission/reception antenna 209.

<2.3. Process of Communication System>

Next, a communication process performed by the communication system according to the embodiment of the present disclosure will be described. As described above, the communication system according to the present embodiment uses one of the single carrier signal or the multicarrier signal to perform downlink communication between the base station apparatus 1 and each terminal device 2.

Here, an example of a radio access technology and a radio frame structure of the communication system according to the present embodiment will be described.

(Radio Access Technology)

As described above, in the present embodiment, each of the base station apparatus 1 and the terminal device 2 supports one or more Radio Access Technologies (RATs). For example, the RATs include LTE and NR. One RAT corresponds to one cell (component carrier). In other words, in a case where a plurality of RATs is supported, the RATs correspond to different cells. In the present embodiment, the cell represents a combination of a downlink resource, an uplink resource, and/or sidelink. In addition, in the following description, a cell corresponding to LTE is referred to as an LTE cell, and a cell corresponding to NR is referred to an NR cell.

The base station apparatus 1 and the terminal device 2 are configured to support communication using a set of one or more cells in the downlink, the uplink, and/or the sidelink. The set of a plurality of cells is also referred to as carrier aggregation or dual connectivity. The carrier aggregation and the dual connectivity will be described in detail later. In addition, each cell uses a predetermined frequency bandwidth. The maximum value, the minimum value, and a possible value in the predetermined frequency bandwidth can be defined in advance.

Figure 10:
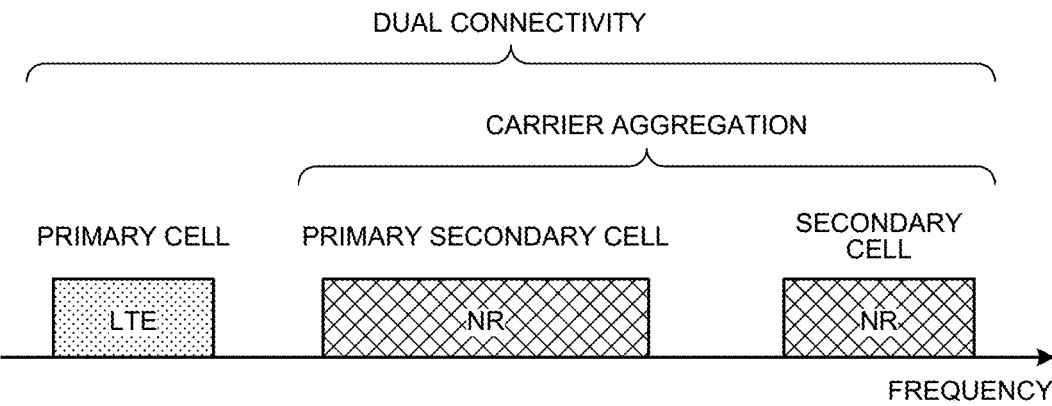
FIG. 10 is a diagram illustrating an example of setting of a component carrier according to the embodiment of the present disclosure.

FIG. 10 is a diagram illustrating an example of setting of the component carrier according to the embodiment of the present disclosure. In the example of FIG. 10, one LTE cell and two NR cells are set. One LTE cell is set as a primary cell. The two NR cells are set as a primary secondary cell and a secondary cell. The two NR cells are aggregated by carrier aggregation. In addition, the LTE cell and the NR cells are aggregated by dual connectivity. Note that the LTE cell and the NR cells may be aggregated by carrier aggregation. In the example of FIG. 1, NR can be connected with the assistance of the LTE cell, the primary cell, removing the need for supporting some functions such as functions for stand-alone communication. The functions for stand-alone communication include functions necessary for initial connection.

Figure 11:
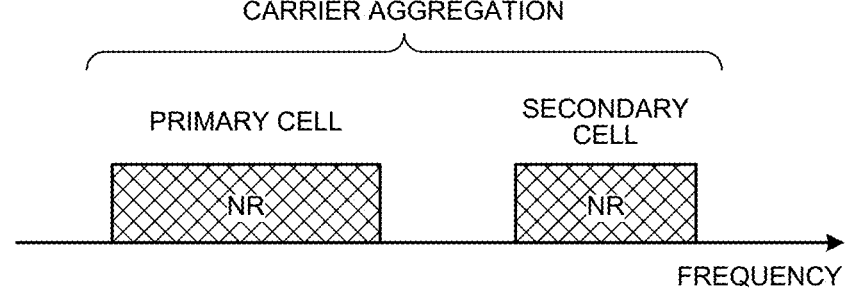
FIG. 11 is a diagram illustrating an example of setting of the component carrier according to the embodiment of the present disclosure.

FIG. 11 is a diagram illustrating an example of setting of the component carrier according to the embodiment of the present disclosure. In the example of FIG. 11, two NR cells are set. The two NR cells are set as the primary cell and the secondary cell and are integrated by carrier aggregation. In this configuration, the NR cells support the functions for stand-alone communication, removing the need for assistance of the LTE cell. Note that the two NR cells may be aggregated by dual connectivity.

(Radio Frame Structure)

Figure 12:
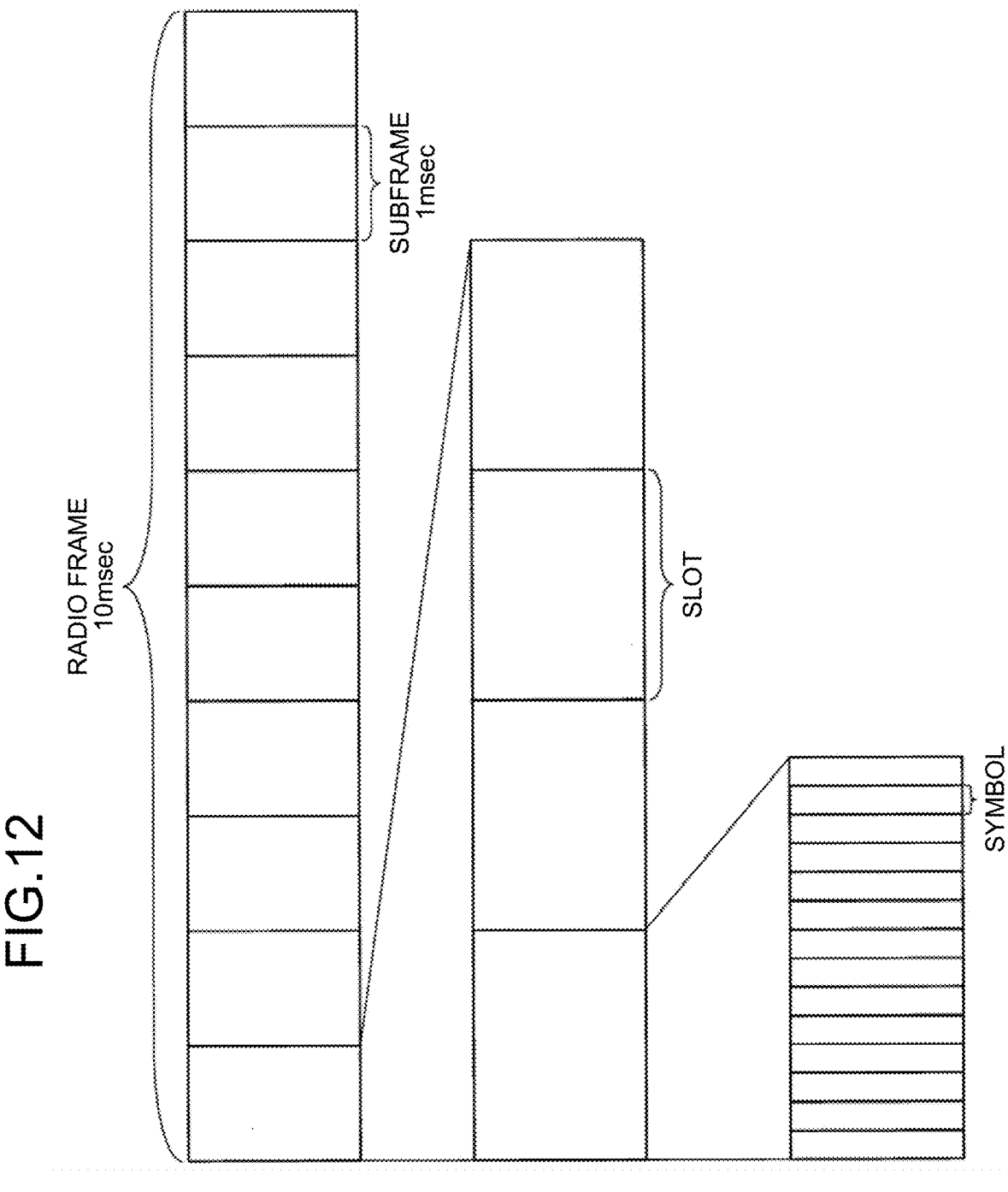
FIG. 12 is an explanatory diagram illustrating an example of an NR frame structure.

Next, an example of an NR frame structure, as an example of the radio frame structure. FIG. 12 is an explanatory diagram illustrating an example of the NR frame structure. A radio frame of 10 ms includes two half frames. A duration of a half frame is 5 ms. Each of the half frames includes five subframes. Furthermore, one subframe includes one or more slots. One slot includes 14 symbols for normal CP and 12 symbols for extended CP.

<2.3.1. Communication Process>

Figure 14:
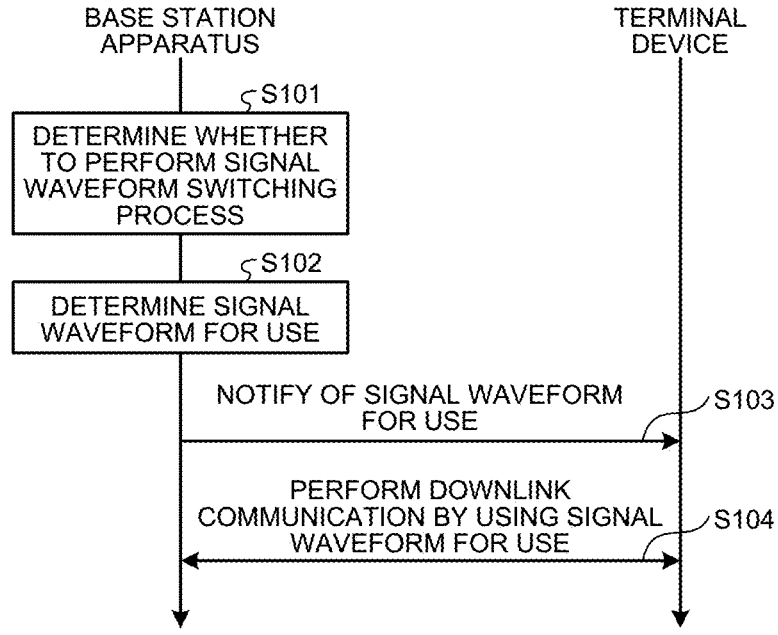
FIG. 14 is a sequence diagram illustrating an example of a communication process according to an embodiment of the present disclosure.

Next, the communication process performed in the communication system according to an embodiment of the present disclosure will be described with reference to FIG. 14. FIG. 14 is a sequence diagram illustrating an example of the communication process according to the embodiment of the present disclosure.

As illustrated in FIG. 14, the base station apparatus 1 determines first whether to switch the signal waveforms (Step S101). Subsequently, when switching the signal waveforms for downlink communication, the base station apparatus 1 determines the signal waveform for use (Step S102). Note that, when the signal waveforms are not switched, the base station apparatus 1 performs downlink communication by using the signal waveform that is defined in advance.

Next, the base station apparatus 1 notifies the corresponding terminal device 2 of information about the determined signal waveform for use (waveform information) (Step S103). Then, the base station apparatus 1 and the terminal device 2 perform downlink communication by using the signal waveform for use (Step S104).

Hereinafter, processing in each step will be described in detail.

<2.3.2. Signal Waveform Switching Process by Base Station Apparatus>

As described above, in the communication system according to the present embodiment, downlink communication is performed by switching the single carrier signal and the multicarrier signal. In downlink communication, the base station apparatus 1 selects one of the single carrier signal and the multicarrier signal.

[Switching Determination]

First, the base station apparatus 1 determines whether to perform a signal waveform switching process, as illustrated in Step S101 of FIG. 14. The base station apparatus 1 determines whether to switch the signal waveforms according to, for example, the capability of the base station apparatus 1. The base station apparatus 1 determines whether to switch the signal waveforms according to, for example, the maximum transmission power of the base station apparatus 1 or the presence or absence of a transmission circuit corresponding to the plurality of signal waveforms. For example, in a case where the maximum transmission power of the base station apparatus 1 is equal to or larger than a predetermined threshold and the power amplifier can be operated in a linear region even if the multicarrier signal is transmitted, the base station apparatus 1 performs downlink communication by using the multicarrier signal without switching the signal waveforms. Alternatively, in a case where the base station apparatus 1 includes the transmission circuit corresponding to a single signal waveform, for example, in a case where the base station apparatus 1 includes the transmission circuit corresponding only to the multicarrier signal, the base station apparatus 1 performs downlink communication by using the multicarrier signal without switching the signal waveforms.

Alternatively, the base station apparatus 1 may determine whether to switch the signal waveforms according to coverage or data throughput required for the downlink communication. For example, in a case where the required coverage is narrow, having small transmission power, the base station apparatus 1 selects the multicarrier signal that has high frequency utilization efficiency without switching the signal waveforms. In addition, also in a case where the required data throughput is high, the base station apparatus 1 selects the multicarrier signal that has high frequency utilization efficiency without switching the signal waveforms.

In addition, the base station apparatus 1 determines whether to switch the signal waveforms, for example, according to the capability of the terminal device 2 that is a communication partner. In this case, the base station apparatus 1 determines whether to switch the signal waveforms, for the plurality of terminal devices 2. The base station apparatus 1 determines whether to switch the signal waveforms according to, for example, whether the terminal device 2 has a reception circuit corresponding to the plurality of signal waveforms. For example, in a case where, the terminal device 2 has a reception circuit corresponding to a single signal waveform, for example, in a case where the terminal device 2 has a reception circuit corresponding only to the multicarrier signal, the base station apparatus 1 performs downlink communication with the multicarrier signal without switching the signal waveforms.

[Targets for which the Signal Waveform is to be Switched]

In a case where the base station apparatus 1 determines to perform the switching process, the base station apparatus 1 switches the signal waveforms according to, for example, the physical channel or the frequency band. The base station apparatus 1 switches the signal waveforms, for a predetermined physical channel or a predetermined frequency band. Hereinafter, targets for which the base station apparatus 1 is to switch the signal waveforms will be described.

(Physical Channel)

The base station apparatus 1 switches, for example, the signal waveforms, for a predetermined physical channel/signal. The base station apparatus 1 uses, for example, the signal waveform selected from the multicarrier signal and the single carrier signal, for a physical channel/signal used for transmission of data information, more specifically, PDSCH and/or PDSCH DMRS. On the other hand, a predetermined signal waveform is used, for a physical channel/signal other than a predetermined physical channel, for example, a physical channel/signal used for transmission of the control information, more specifically, SSB, PDCCH, and/or CSI-RS. For example, the base station apparatus 1 can use the single carrier signal as the predetermined signal waveform to widen the coverage, more reliably transmitting the control information.

(Bandwidth Part)

For example, in a case where a contiguous subset of common resource blocks, which is called a Bandwidth part (BWP), is set, the signal waveforms are switched for a predetermined BWP. For example, the base station apparatus 1 switches the signal waveforms in another BWP excepting initial active bandwidth, but transmits a signal by using the predetermined signal waveform in initial active bandwidth.

In this case, the base station apparatus 1 uses, for example, initial active bandwidth to notify of information about the signal waveform to be used in the another BWP.

(Carrier Aggregation/Dual Connectivity)

As described above, in a case where the communication system supports communication using carrier aggregation or dual connectivity, the base station apparatus 1 switches the signal waveforms, for a predetermined cell. For example, the base station apparatus 1 performs transmission by switching signal waveforms, in a secondary cell (Scell) or a secondary cell group (SCG) including the secondary cell. On the other hand, in the primary cell (Pcell) or a master cell group (MCG) including the primary cell, the base station apparatus 1 transmits a signal by using a predetermined signal waveform. In this case, the base station apparatus 1 notifies of the information about the signal waveform to be used in the Scell or the SCG by using, for example, the Pcell or the MCG.

[Signal Waveform Selection]

Next, selection criteria for selecting the signal waveform for use will be described, which is used when the base station apparatus 1 selects the signal waveform to be used for downlink communication in Step S102 of FIG. 14. The base station apparatus 1 switches the signal waveforms according to the following selection criteria.

Position of the terminal device
Bandwidth or channel width
Time length
Signal waveform for use in uplink communication
Signal waveform for use in another wireless communication system (Position of Terminal Device)

The base station apparatus 1 selects the signal waveform for use, according to the position of the terminal device 2. For example, when the distance between the base station apparatus 1 and the terminal device 2 are distant from each other, large transmission power is required. Low PAPR is demanded to ensure large transmission power by the power amplifier. Therefore, the base station apparatus 1 selects the single carrier signal as the signal waveform for use, when the large transmission power is required. On the other hand, when the base station apparatus 1 and the terminal device are closer to each other, the transmission power may be small. Therefore, PAPR may be high, and in this case, the base station apparatus 1 selects the multicarrier signal as the signal waveform for use.

Figure 13:
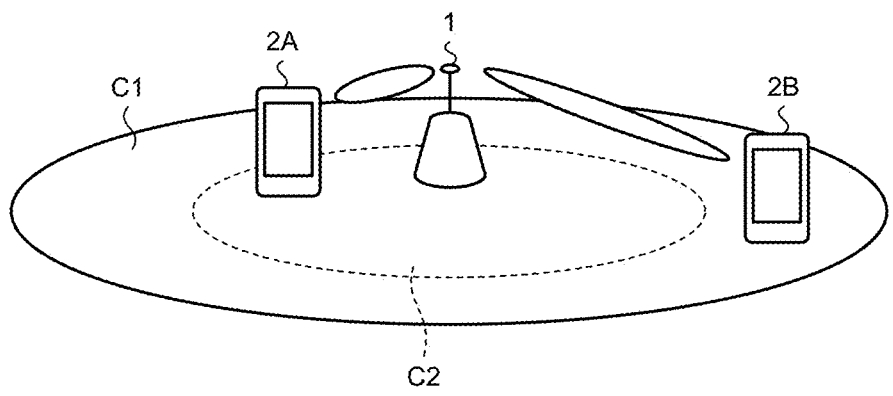
FIG. 13 is a diagram illustrating a positional relationship between a base station apparatus and terminal devices.

FIG. 13 is a diagram illustrating a positional relationship between the base station apparatus 1 and terminal devices 2. As illustrated in FIG. 13, when the cell C is divided into two areas of a cell edge C1 and a cell center C2, the base station apparatus 1 selects the single carrier signal as the signal waveform to be used for downlink communication with the terminal device 2B positioned at the cell edge C1. In addition, the base station apparatus 1 selects the multicarrier signal as the signal waveform for use that is used for downlink communication with the terminal device 2A positioned at the cell center C2.

The base station apparatus 1 determines whether the terminal device 2 is positioned at the cell edge C1 or at the cell center C2, on the basis of, for example, RSRP. More specifically, when the terminal device 2 has an RSRP less than a predetermined threshold, the base station apparatus 1 determines that the terminal device 2 is spaced apart and the terminal device 2 is positioned at the cell edge C1. On the other hand, when the RSRP of the terminal device 2 is equal to or larger than the predetermined threshold, it is determined that the distance to the terminal device 2 is positioned closer and the terminal device 2 is positioned at the cell center C2.

Alternatively, the base station apparatus 1 may determine the position of the terminal device 2 in the cell C, on the basis of the position information of the terminal device 2. For example, the base station apparatus 1 determines whether the terminal device 2 is positioned at the cell edge C1 or at the cell center C2, on the basis of the position information acquired from GPS or the like mounted on the terminal device 2.

(Bandwidth or Channel Width)

Alternatively, the base station apparatus 1 may select the signal waveform according to the bandwidth or the channel width that is used for downlink communication. For example, the wider the band, the lower transmit power density. Therefore, in a case where the single carrier signal with which the transmission power can be increased is selected, the transmit power density can be ensured even with a wider band. On the other hand, in a case where the multicarrier signal with high PAPR that makes it difficult to increase the transmission power is selected, the transmission power density decreases as the band becomes wider, and the multicarrier signal is desirably used in a narrow band to ensure the transmission power.

Therefore, the base station apparatus 1 selects the signal waveform according to the bandwidth or the channel width used for downlink communication. Specifically, the base station apparatus 1 selects the single carrier signal when the bandwidth is equal to or larger than a predetermined width, and selects the multicarrier signal when the bandwidth is less than the predetermined width.

(Time Length)

Alternatively, the base station apparatus 1 may select the signal waveform according to a time length. For example, the base station apparatus 1 selects the single carrier signal, for a predetermined time length, and selects the multicarrier signal, for the other time lengths. In this manner, the base station apparatus 1 can switch the signal waveforms according to the time length.

More specifically, the base station apparatus 1 switches the signal waveforms, for example, for each slot. For example, the base station apparatus 1 selects the single carrier signal, for a predetermined slot, and selects the multicarrier signal, for the other slots.

Note that the time length (e.g., the number of slots) for which the single carrier signal is selected may be the same as or different from the time length (e.g., the number of slots) for which the multicarrier signal is selected. For example, the time length of the downlink communication with the multicarrier signal may be longer or may be shorter than that the time length of the downlink communication with the single carrier signal. Alternatively, the multicarrier signal and the single carrier signal may be switched at the same periodic intervals.

(Signal Waveform for Use in Uplink Communication)

The base station apparatus 1 selects the signal waveform for use, according to a signal waveform for use in uplink communication. In the uplink communication, either a single carrier signal or a multicarrier signal is used. In this configuration, the base station apparatus 1 uses the signal waveforms to be used for the uplink communication also in the downlink communication. This configuration makes it possible, for example, to use the same signal waveform between uplink communication and downlink communication, and the signal waveform for use, for both of the uplink communication and the downlink communication can be notified of at a time. Note that the notification of the information about the signal waveform for use, by the base station apparatus 1 will be described later in detail.

(Signal Waveform for Use in Another Wireless Communication System)

The base station apparatus 1 selects the signal waveform for use, according to a signal waveform for use of another wireless communication system. For example, a frequency band of 60 GHz is used not only for cellular communication but also for wireless communication (e.g., IEEE 802.11ad, 11ay, and the like) according to, for example, a wireless LAN standard. When another wireless communication system that performs communication in the same frequency band is detected, the base station apparatus 1 selects the signal waveforms used by the another wireless communication system, as the signal waveforms for use. For example, in the wireless communication according to IEEE 802.11ad, the single carrier signal is used The base station apparatus 1 that has detected the communication using the single carrier signal selects the single carrier signal as the signal waveform for use.

As described above, performing communication using the same signal waveform as that of another wireless communication system makes it possible for the another wireless communication system to readily detect the signal transmitted by the base station apparatus 1. Similarly, the base station apparatus 1 can also more easily detect the signal transmitted and received to and from the another wireless communication system.

[Frequency of Switching Signal Waveforms]

The base station apparatus 1 switches the signal waveforms in any of three frequency modes, that is, static mode, semi-static mode, and dynamic mode.

In a case where the signal waveforms are switched in the static mode, the base station apparatus 1 selects a signal waveform for use once, notifies the terminal device 2 of the selected signal waveform, and then uses the signal waveform notified of. In this case, the base station apparatus 1 adds the information about the selected signal waveform for use, for example, to system information and notifies the terminal device 2 of the information.

In a case where the signal waveforms are switched in the semi-static mode, the base station apparatus 1 selects a signal waveform for use at predetermined periodic interval, and notifies the terminal device 2 of the selected signal waveform. In this case, the base station apparatus 1 adds the information about the selected signal waveform for use, for example, to RRC signaling and notifies the terminal device 2 of the information.

In a case where the signal waveforms are switched in the dynamic mode, the base station apparatus 1 selects a signal waveform for use every time transmitting the data information, and notifies the terminal device 2 of the selected signal waveform. In this case, the base station apparatus 1 adds the information about the selected signal waveform for use, for example, to the PDCCH and notifies the terminal device 2 of the information.

<2.3.3. Notification Processing for Signal Waveform for Use>

As illustrated in Step S103 of FIG. 14, the base station apparatus 1 that has switched the signal waveforms for use notifies the terminal device 2 of the selected signal waveform for use. As a method of transmitting the information about the signal waveform for use to the terminal device 2 by the base station apparatus 1, three methods are considered, that is, an Explicit transmission method, an Implicit transmission method, and a method of blind detection of the signal waveform for use that is used on the terminal device 2 side.

[Explicit Signalling]

First, a description will be made of explicit transmission of the information about the signal waveform for use (hereinafter, also referred to as waveform information) by the base station apparatus 1. In this case, the base station apparatus 1 transmits the waveform information, the waveform information being added to, for example, the system information, RRC signaling, or DCI.

(System Information)

The system information is classified into a Master Information Block (MIB) and a System Information Block (SIB).

The base station apparatus 1 adds the waveform information to, for example, MIB as the system information, and transmits the waveform information. The waveform information is added to the MIB as, for example, one bit parameter. The waveform information sets, for example, 1 or 0 to the one bit parameter to specify a signal waveform of the single carrier signal or the multicarrier signal.

More specifically the waveform information is added to, for example, the Synchronization signal (SSB/PBCH block) of MIB and transmitted. In this case, the base station apparatus 1 transmits the SSB by using the predetermined signal waveform (e.g., the single carrier signal), and transmits a physical downlink channel/signal other than the SSB by using the signal waveform specified in the waveform information. For example, the base station apparatus 1 transmits PDCCH or PDSCH included in SIB, by using a signal waveform specified in the waveform information.

Alternatively, the base station apparatus 1 may add the waveform information to, for example, SIB as the system information, and transmits the waveform information. In this case, the base station apparatus 1 transmits SSB, type0-PDCCH, and PDSCH scheduled by type0-PDCCH, by using the predetermined signal waveform (e.g., the single carrier signal), and transmits the other physical downlink channels/signals by using the signal waveform specified in the waveform information. As described above, transmitting a predetermined physical downlink channel/signal by using the predetermined signal waveform makes it possible for the terminal device 2 to more reliably receive the predetermined physical downlink channel/signal.

(RRC Signaling)

The base station apparatus 1 adds a parameter indicating the waveform information to, for example, the RRC signaling after RRC connection, and transmits the parameter. Therefore, the base station apparatus 1 can periodically notify of the waveform information.

(DCI)

The base station apparatus 1 adds the waveform information to DCI of PDCCH and transmits the waveform information. The base station apparatus 1 notifies of the waveform information by using field included in DCI. Thus, the base station apparatus 1 is allowed to dynamically switch the signal waveforms.

(Others)

As described above, in a case where the base station apparatus 1 selects the signal waveform that is the same as the signal waveform used in uplink communication, as the signal waveform for downlink communication, the base station apparatus 1 may notify of the waveform information in association with notification of the signal waveform for use for the uplink communication.

Specifically, the base station apparatus 1 gives notification that the signal waveform for use for uplink communication is the signal waveform for use for downlink communication. In other words, the base station apparatus 1 collectively notifies of the information about the signal waveforms for use for uplink communication and downlink communication, as one piece of information.

As described above, for example, notification of the waveform information added to, for example, DCI is transmitted, for example, with the single carrier signal, thus, complicating multiplexing of resources of the single carrier signal and the multicarrier signal. Therefore, it is desirable to transmit the notification of the waveform information as early as possible, for example, using the system information such as MIB. However, notification of the waveform information by using the system information makes it difficult to dynamically allocate the signal waveform.

Therefore, for example, in a case where the base station apparatus 1 adds the waveform information to the system information such as MIB and transmits the system information and then switches the signal waveform for use, the waveform information after switching may be added to the RRC signaling or DCI, for transmission.

As described above, the base station apparatus 1 transmits the waveform information a plurality of times, thus enabling to individually switch the signal waveforms for use used by the terminal devices 2 while transmitting the waveform information common to the cells.

[Implicit Signalling]

Next, a description will be made of implicit notification of the waveform information by the base station apparatus 1. In this case, the base station apparatus 1 changes, for example, the configuration of SSB, the configuration of PDCCH, or the like according to the signal waveform for use to notify each terminal device 2 of the waveform information.

(Configuration of SSB)

For example, a correspondence relationship between a signal waveform and a configuration of SSB is determined in advance, the base station apparatus 1 transmits SSB having a configuration corresponding to a selected signal waveform for use to notify the terminal device 2 of the waveform information.

More specifically, for example, a Primary Synchronization Signal (PSS) and/or Secondary Synchronization Signal (SSS) sequence is defined for each signal waveform, and the base station apparatus 1 transmits PSS and/or SSS according to the defined sequence. When the PSS and/or the SSS is detected, the terminal device 2 determines a signal waveform corresponding to the detected PSS and/or SSS as the signal waveform for use. In this manner, the base station apparatus 1 is configured to notify of the waveform information by associating the signal waveform with the PSS and/or SSS sequence.

Alternatively, the base station apparatus 1 may notify of the waveform information by resource allocation of PSS/SSS/PBCH (SSB block). In this case, resources for PSS/SSS/PBCH (SSB block) are defined for each signal waveform. When the PSS/SSS/PBCH (SSB block) is detected, the terminal device 2 determines, as the signal waveform for use, the signal waveform corresponding to resources to which the detected PSS/SSS/PBCH (SSB block) is transmitted In this manner, the association between the signal waveform with the resources makes it possible for the base station apparatus 1 to notify of the waveform information.

(Configuration of PDCCH)

For example, associating the signal waveform with CORESET or search space for PDCCH, the type of DCI, RNTI, and the like makes it possible for the base station apparatus 1 to notify the terminal device 2 of the waveform information by transmitting PDCCH.

For example, the signal waveform is associated with CORESET, for example, each of CORESET #0 and the other CORESETs, and when the base station apparatus 1 transmits either CORESET #0 or the other CORESETs, the terminal device 2 detects the signal waveform for use.

Alternatively, the signal waveform is associated with each of Common Search Space (CSS) and UE-specific Search Space (USS) of the search space, and the base station apparatus 1 notifies the terminal device 2 of the signal waveform for use, depending on whether the PDCCH is transmitted in which search section.

Alternatively, the signal waveform may be associated with the type of DCI, for example, each of fallback DCI and non-fallback DCI. In this case, when the base station apparatus 1 transmits either the fallback DCI or the non-fallback DCI, the terminal device 2 detects the signal waveform for use.

Alternatively, the signal waveform may be associated with RNTI, for example, each of C-RNTI and other RNTIs. In this case, when the base station apparatus 1 transmits either the C-RNTI or the other RNTIs, the terminal device 2 detects the signal waveform for use.

[Blind Detection]

In addition to explicit or implicit transmission of the waveform information by the base station apparatus 1, as described above, a method of acquiring (blind detection) the waveform information can be provided. In the method, the signal transmitted by the base station apparatus 1 by using the signal waveform for use is detected by the terminal device 2.

(Detection Based on PAPR)

As described above, the single carrier signal has a low PAPR, whereas the multicarrier signal has a high PAPR. Therefore, for example, the terminal device 2 detects an amplitude variation of the received signal to determine whether the signal waveform of the received signal shows the single carrier signal or the multicarrier signal.

The terminal device 2 blindly detects the state of the signal waveform of a symbol in downlink communication. More specifically, the terminal device 2 detects a variation (e.g., PAPR) in amplitude on the frequency axis. When the detected variation is below a predetermined threshold, the terminal device 2 determines that the signal waveform for use is the single carrier signal, and when the detected variation is equal to or more than the predetermined threshold, the terminal device 2 determines that the signal waveform for use is the multicarrier signal.

Accordingly, the terminal device 2 can detect the signal waveform for use, even if the base station apparatus 1 does not notify of the waveform information.

(Detection Based on Frame Structure)

In addition to the detection based on PAPR, the change of the frame structure by using the single carrier signal and the multicarrier signal by the base station apparatus 1 may cause the terminal device 2 to blindly detect the signal waveform.

In this configuration, the base station apparatus 1 changes a frame format or a symbol length of the radio frame, a CP configuration, or the like of the radio frame, for each signal waveform. For example, the base station apparatus 1 changes the CP configuration with the single carrier signal and the multicarrier signal. More specifically, the base station apparatus 1 changes the CP configuration, for example, to zero padding or unique word, according to the signal waveform. Assuming that the CP configuration is zero padding, the power of a portion corresponding to the CP of the radio frame becomes zero. On the other hand, assuming that the CP configuration is a unique word, the power of a portion corresponding to the CP of the radio frame does not become zero. Therefore, the terminal device 2 detects the signal waveform of the received signal by performing threshold determination on the power of the portion of the received signal corresponding to the CP.

In this manner, the base station apparatus 1 can also add the waveform information to the transmission signal and transmit the transmission signal to the terminal device 2 by using the signal waveform for use. Here, the base station apparatus 1 adds the waveform information to the CP, for transmission. Therefore, even if the base station apparatus 1 does not separately transmit the waveform information, the base station apparatus 1 and the terminal device 2 can perform communication using the signal waveform for use.

Note that, in addition to the CP configuration described above, the base station apparatus 1 may change the symbol length according to, for example, the signal waveform for use. As described above, in the normal CP, one slot includes 14 symbols, but the number of symbols of one slot may be changed, for example, according to the signal waveform. More specifically, for example, the base station apparatus 1 sets the number of symbols in one slot to 14, when communication is performed by using the multicarrier signal, and sets the number of symbols in one slot to 28 that is twice the number of symbols of that in the communication using the multicarrier signal, when communication is performed by using the single carrier signal.

Alternatively, the base station apparatus 1 may change the number of symbols of CP instead of that of slot, according to the signal waveform. In this configuration, for example, the base station apparatus 1 continuously transmits a plurality of CPs when the single carrier signal is used, and transmits one CP when the multicarrier signal is used. In this manner, the base station apparatus 1 may change the number of CPs, that is, the CP length according to the signal waveform.

<2.3.4. Communication Process According to Signal Waveform for Use>

Upon notifying of the information about the signal waveform for use by the method described above, the base station apparatus 1 uses the signal waveform for use to perform downlink communication with the terminal device 2, as illustrated in Step S104 of FIG. 14. Here, a communication process performed by the base station apparatus 1, according to the signal waveform for use will be described.

[Resource Allocation]

The base station apparatus 1 changes a resource allocation method according to the signal waveform for use. For example, in a case where communication is performed using the multicarrier signal, the base station apparatus 1 discontinuously allocates the transmission signal to the resources. In addition, when the single carrier signal is used, the base station apparatus 1 continuously allocates the transmission signal to the resources.

As described above, the base station apparatus 1 selects the single carrier signal when it is desired to transmit a signal with low PAPR. The single carrier signals can be transmitted with low PAPR by being arranged together on a frequency axis. Therefore, when selecting the single carrier signal, the base station apparatus 1 selects non-contiguous allocation (Resource allocation Type 1) as the resource allocation method.

On the other hand, when the multicarrier signal is used for communication, the base station apparatus 1 selects non-contiguous allocation (resource allocation type 0). Therefore, the base station apparatus 1 can transmit a signal by using a portion having good characteristics on the frequency axis, improving the frequency utilization efficiency.

[Beamforming/Precoding]

In a case where data signal is multiplexed on the same resource and transmitted, for example, as in MIMO, the base station apparatus 1 determines the number of layers (the number of data signals multiplexed) according to the signal waveform. For example, in a case where the single carrier signal is used, the number of layers is limited to two or less of a vertically polarized wave and a horizontally polarized wave. On the other hand, in a case where the multicarrier signal is used, the number of layers is not particularly limited. Therefore, the base station apparatus 1 may transmit the multicarrier signal by setting the number of layers, for example, to three or more.

Accordingly, the base station apparatus 1 sets the number of layers in MIMO to two or less in a case where the single carrier signal is used, and sets the number of layers to three or more in a case where the multicarrier signal is used. In this manner, the base station apparatus 1 determines the number of layers in MIMO, according to the signal waveform.

As described above, the number of layers is different according to the signal waveform, and thus, precoding and feedback (e.g., Channel State Information (CSI)) from the terminal device 2 are also different according to the signal waveform. For example, Rank Indicator (RI) and Precoding Matrix Indicator (PMI) included in CSI have values according to the signal waveform.

[Modulation Methods]

In addition, the base station apparatus 1 determines a modulation method according to the signal waveform. For example, in a case where low PAPR is demanded, the base station apparatus 1 performs downlink communication using the single carrier signal. Therefore, when the single carrier signal is used, the base station apparatus 1 selects a modulation method with low PAPR. An example of the modulation method with low PAPR includes π/2 BPSK.

Meanwhile, when there is no problem even with high PAPR, the base station apparatus 1 uses the multicarrier signal to perform to perform downlink communication. Therefore, when the multicarrier signal is used, the base station apparatus 1 selects a modulation method other than the modulation method with low PAPR. For example, the base station apparatus 1 selects a modulation method such as QPSK or 16QAM that has higher transmission efficiency than BPSK, as the modulation method for the multicarrier signal.

As described above, determination of the modulation method according to the signal waveform by the base station apparatus 1 improves the transmission efficiency while satisfying the request for low PAPR.

As described above, in the communication process according to the present embodiment, the base station apparatus 1 determines the signal waveform for use that is used for downlink communication, from the plurality of signal waveforms including the single carrier signal. The base station apparatus 1 notifies the terminal device 2 of the information about the determined signal waveform for use (waveform information). The terminal device 2 that has received the notification performs downlink communication with the base station apparatus 1 by using the signal waveform for use.

Selection of the single carrier signal by the base station apparatus 1 makes it possible to satisfy the request for low PAPR, and selection of a signal waveform other than the single carrier signal by the base station apparatus 1 makes it possible to improve the transmission efficiency of the entire system.

3. APPLICATION EXAMPLES

The technology according to the present disclosure is applicable to various products. For example, the base station apparatus 1 may be implemented as any type of evolved Node B (eNB) such as macro eNB or small eNB. The small eNB may be eNB that covers a cell smaller than a macro cell, such as pico eNB, micro eNB, or home (femto) eNB. Instead, the base station apparatus 1 may be implemented as another type of base station such as NodeB or Base Transceiver Station (BTS). The base station apparatus 1 may include a main body (also referred to as base station apparatus) that controls wireless communication, and one or more Remote Radio Heads (RRHs) that are arranged at places different from that of the main body. Furthermore, various types of terminals, which are described later, may operate as the base station apparatus 1 by temporarily or semi-persistently serving base station functions.

Furthermore, for example, the terminal device 2 may be implemented as a mobile terminal such as a smartphone, tablet Personal Computer (PC), notebook PC, portable game terminal, a portable/dongle mobile router, and digital camera, and an in-vehicle terminal such as a car navigation device. Furthermore, the terminal device 2 may be implemented as a terminal (also referred to as Machine Type Communication (MTC) terminal) that performs machine to machine (M2M) communication. Furthermore, the terminal device 2 may be a wireless communication module (e.g., an integrated circuit module including one die) that is mounted on each of these terminals.

<3.1. Application Example for Base Station>

First Application Example

Figure 15:
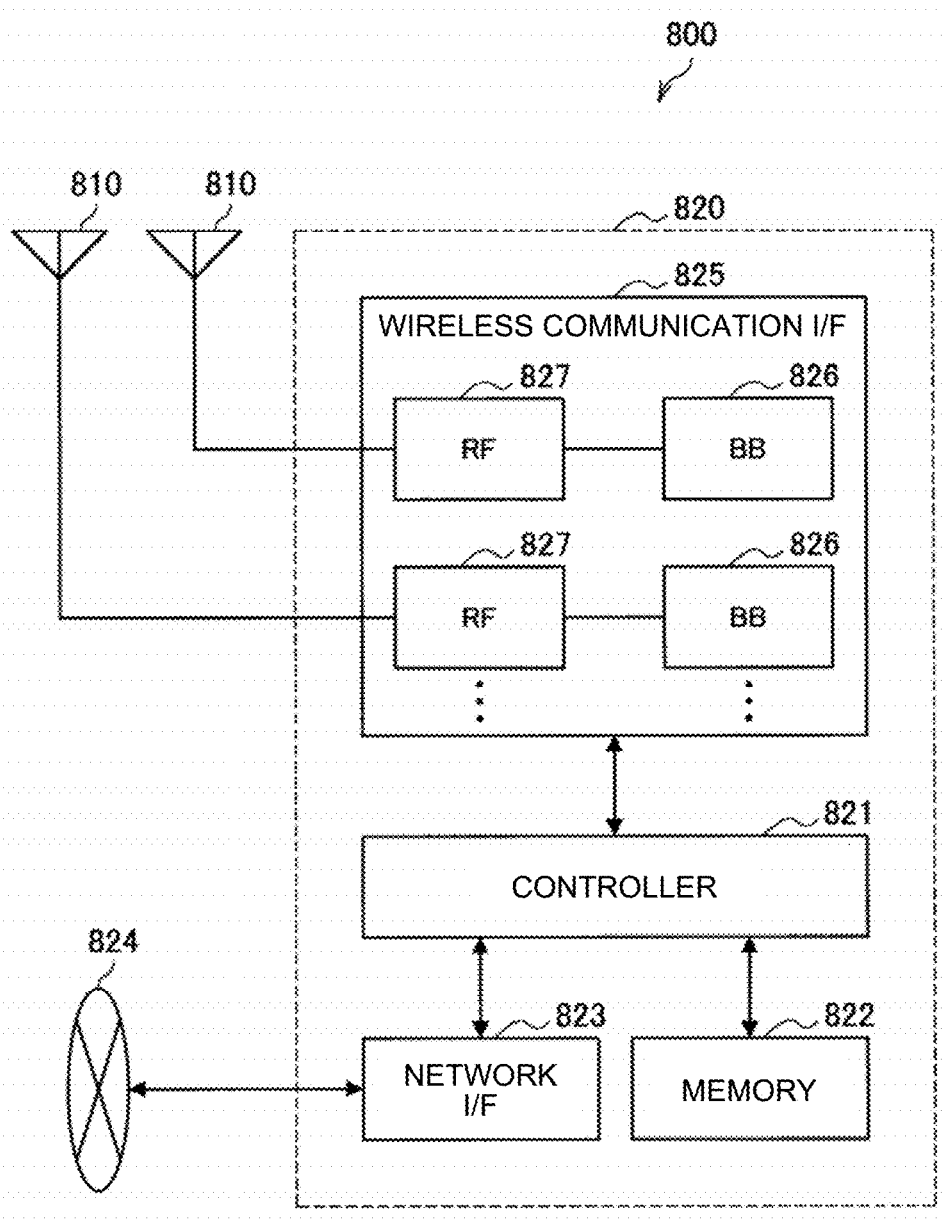
FIG. 15 is a block diagram illustrating a first example of a schematic configuration of eNB to which a technology according to the present disclosure is applicable.

FIG. 15 is a block diagram illustrating a first example of a schematic configuration of eNB to which a technology according to the present disclosure is applicable. The eNB 800 includes one or more antennas 810 and a base station apparatus 820. Each of the antennas 810 and the base station apparatus 820 may be connected to each other via an REF cable.

Each of the antennas 810 includes a single or a plurality of antenna elements (e.g., a plurality of antenna elements constituting a MIMO antenna), and is used for transmission and reception of a radio signal from and to the base station apparatus 820. As illustrated in FIG. 15, the eNB 800 may include a plurality of the antennas 810 that correspond to, for example, a plurality of frequency bands used by the eNB 800. Note that although FIG. 15 illustrates an example in which the eNB 800 includes the plurality of the antennas 810, the eNB 800 may include a single antenna 810.

The base station apparatus 820 includes a controller 821, a memory 822, a network interface 823, and a wireless communication interface 825.

The controller 821 may be, for example, CPU or DSP, and causes various functions of an upper layer of the base station apparatus 820 to be performed. For example, the controller 821 generates a data packet from data in a signal processed by the wireless communication interface 825, and transfers the generated packet via the network interface 823. The controller 821 may generate a bundled packet by bundling data from a plurality of baseband processors and transfer the generated bundled packet. In addition, the controller 821 may have a logical function of executing control, such as Radio Resource Control, Radio Bearer Control, Mobility Management, Admission Control, or Scheduling. Furthermore, the control may be executed in cooperation with peripheral eNB or a core network node. The memory 822 includes RAM and ROM, and stores programs executed by the controller 821 and various control data (e.g., terminal list, transmission power data, scheduling data, etc.).

The network interface 823 is a communication interface for connecting the base station apparatus 820 to a core network 824. The controller 821 may communicate with a core network node or another eNB via the network interface 823. In this configuration, the eNB 800 and the core network node or the another eNB may be connected to each other by a logical interface (e.g., S1 interface or X2 interface). The network interface 823 may be a wired communication interface or a wireless communication interface for wireless backhaul. When the network interface 823 is the wireless communication interface, the network interface 823 may use, for wireless communication, a frequency band higher than a frequency band used by the wireless communication interface 825.

The wireless communication interface 825 supports any cellular communication system such as Long Term Evolution (LTE) or LTE-Advanced, and provides a wireless connection to a terminal positioned in a cell of the eNB 800 via each antenna 810. The wireless communication interface 825 can typically include a baseband (BB) processor 826, an RF circuit 827, and the like. The BB processor 826 may perform, for example, encoding/decoding, modulation/demodulation, and multiplexing/demultiplexing, and executes various signal processing in each layer (e.g., L1, Medium Access Control (MAC), Radio Link Control (RLC), and Packet Data Convergence Protocol (PDCP)). Instead of the controller 821, the BB processor 826 may have some or all of the logical functions described above. The BB processor 826 may include a module including a memory that stores a communication control program, a processor that executes the program, and a related circuit, and the BB processor 826 may have a function that is changeable by updating the program. Furthermore, the module described above may be a card or a blade inserted into a slot of the base station apparatus 820, or may be a chip mounted on the card or the blade. Meanwhile, the RF circuit 827 may include a mixer, a filter, an amplifier, and the like, and transmits and receives a radio signal via the antenna 810.

The wireless communication interface 825 includes a plurality of BB processors 826 as illustrated in FIG. 15, and the plurality of BB processors 826 may correspond to, for example, a plurality of frequency bands used by the eNB 800. Furthermore, the wireless communication interface 825 includes a plurality of RF circuits 827 as illustrated in FIG. 15, and the plurality of RF circuits 827 may correspond to, for example, a plurality of antenna elements. Note that although the example in which the wireless communication interface 825 includes the plurality of BB processors 826 and the plurality of RF circuits 827 is illustrated in FIG. 15, the wireless communication interface 825 may include a single BB processor 826 or a single RF circuit 827.

Second Application Example

Figure 16:
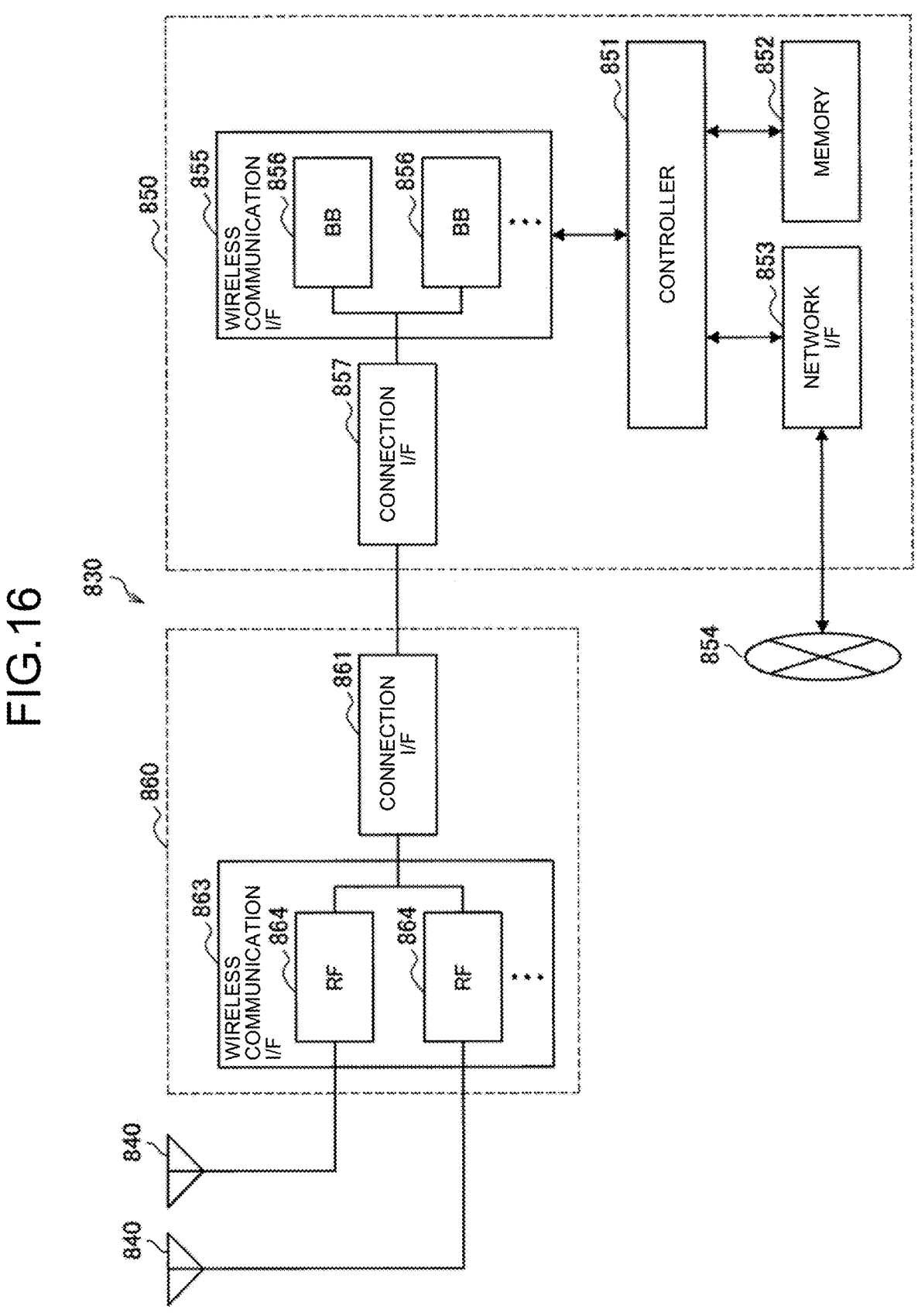
FIG. 16 is a block diagram illustrating a second example of a schematic configuration of the eNB to which a technology according to the present disclosure is applicable.

FIG. 16 is a block diagram illustrating a second example of a schematic configuration of eNB to which a technology according to the present disclosure is applicable. The eNB 830 includes one or more antennas 840, a base station apparatus 850, and RRH 860. Each of the antennas 840 and the RRH 860 can be connected to each other via an RF cable. In addition, the base station apparatus 850 and the RRH 860 can be connected to each other via a high-speed line such as an optical fiber cable.

Each of the antennas 840 includes a single or a plurality of antenna elements (e.g., a plurality of antenna elements constituting a MIMO antenna), and is used for transmission and reception of a radio signal from and to the RRH 860. As illustrated in FIG. 16, the eNB 830 may include a plurality of the antennas 840 that correspond to, for example, a plurality of frequency bands used by the eNB 830. Note that although FIG. 16 illustrates an example in which the eNB 830 includes the plurality of the antennas 840, the eNB 830 may include a single antenna 840.

The base station apparatus 850 includes a controller 851, a memory 852, a network interface 853, a wireless communication interface 855, and a connection interface 857. The controller 851, the memory 852, and the network interface 853 are configured similarly to the controller 821, the memory 822, and the network interface 823 which are described with reference to FIG. 15.

The wireless communication interface 855 supports any cellular communication system such as LTE or LTE-Advanced, and provides a wireless connection to a terminal positioned in a sector corresponding to the RRH 860 via the RRH 860 and each antenna 840. The wireless communication interface 855 can typically include a BB processor 856, and the like. The BB processor 856 is configured similarly to the BB processor 826 which is described with reference to FIG. 15, except that the BB processor 856 is connected to an RF circuit 864 of the RRH 860 via the connection interface 857. The wireless communication interface 855 includes a plurality of BB processors 856 as illustrated in FIG. 16, and the plurality of BB processors 856 may correspond to, for example, a plurality of frequency bands used by the eNB 830. Note that although the example in which the wireless communication interface 855 includes the plurality of BB processors 856 is illustrated in FIG. 16, the wireless communication interface 855 may include a single BB processor 856.

The connection interface 857 is an interface for connecting the base station apparatus 850 (wireless communication interface 855) to the RRH 860. The connection interface 857 may be a communication module for communication on the high-speed line connecting the base station apparatus 850 (wireless communication interface 855) and the RRH 860.

In addition, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high-speed line.

The wireless communication interface 863 transmits and receives a radio signal via each antenna 840. The wireless communication interface 863 may typically include the RF circuit 864, and the like. The RF circuit 864 may include a mixer, a filter, an amplifier, and the like, and transmits and receives a radio signal via the antenna 840. The wireless communication interface 863 includes a plurality of RF circuits 864 as illustrated in FIG. 16, and the plurality of RF circuits 864 may correspond to, for example, a plurality of antenna elements. Note that although the example in which the wireless communication interface 863 includes the plurality of RF circuits 864 is illustrated in FIG. 16, the wireless communication interface 863 may include a single RF circuit 864.

The eNB 800, the eNB 830, the base station apparatus 820, or the base station apparatus 850 illustrated in FIGS. 15 and 16 can correspond to the base station apparatus 1 described with reference to FIG. 2 and the like.

<3.2. Application Example for Terminal Device>

First Application Example

Figure 17:
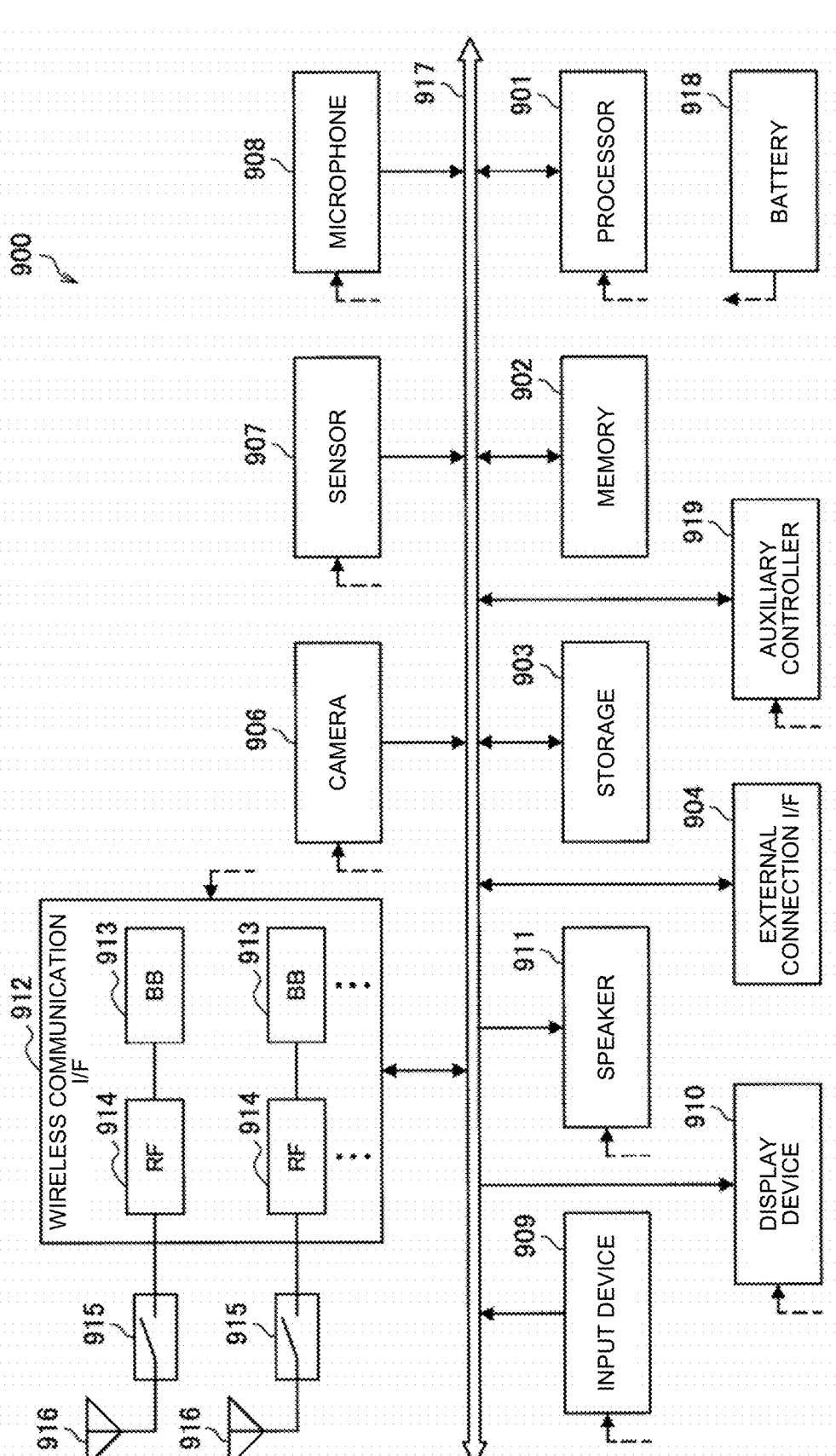
FIG. 17 is a block diagram illustrating an example of a schematic configuration of a smartphone to which a technology according to the present disclosure is applicable.

FIG. 17 is a block diagram illustrating an example of a schematic configuration of a smartphone 900 to which a technology according to the present disclosure is applicable. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, CPU or System on Chip (SoC), and controls functions of an application layer and the other layers of the smartphone 900. The memory 902 includes RAM and ROM, and stores programs and data executed by the processor 901. The storage 903 can include a storage medium such as a semiconductor memory or a hard disk. The external connection interface 904 is an interface for connecting an external device such as a memory card or a Universal Serial Bus (USB) device, to the smartphone 900.

The camera 906 includes, for example, an imaging element such as a Charge Coupled Device (CCD) or a Complementary Metal Oxide Semiconductor (CMOS) to generate a captured image. The sensor 907 can include, for example, a sensor group of a positioning sensor, gyroscope sensor, geomagnetic sensor, acceleration sensor, and the like. The microphone 908 converts voice input to the smartphone 900 into a voice signal. The input device 909 includes, for example, a touch sensor that detects a touch on a screen of the display device 910, a keypad, a keyboard, a button, or a switch, and receives an operation or information input from the user. The display device 910 includes the screen such as a liquid crystal display (LCD) or an organic light emitting diode (OLED) display, and displays an output image of the smartphone 900. The speaker 911 converts a voice signal output from the smartphone 900 into voice.

The wireless communication interface 912 supports any cellular communication system such as LTE or LTE-Advanced, and performs wireless communication. The wireless communication interface 912 may typically include a BB processor 913, an RF circuit 914, and the like. The BB processor 913 may perform, for example, encoding/decoding, modulation/demodulation, and multiplexing/demultiplexing, and executes various signal processing for wireless communication. Meanwhile, the RF circuit 914 may include a mixer, a filter, an amplifier, and the like, and transmits and receives a radio signal via the antenna 916. The wireless communication interface 912 may be a one-chip module on which the BB processor 913 and the RF circuit 914 are integrated. The wireless communication interface 912 may include a plurality of the BB processors 913 and a plurality of the RF circuits 914 as illustrated in FIG. 17. Note that although the example in which the wireless communication interface 912 includes the plurality of BB processors 913 and the plurality of RF circuits 914 is illustrated in FIG. 17, the wireless communication interface 912 may include a single BB processor 913 or a single RF circuit 914.

Furthermore, in addition to the cellular communication system, the wireless communication interface 912 may support another type of wireless communication system such as a near field wireless communication system, a proximity wireless communication system, or a wireless Local Area Network (LAN) system, and may include the BB processor 913 and the RF circuit 914 for each wireless communication system, in such a configuration.

The antenna switches 915 are configured to switch the connection destinations of the antennas 916, between a plurality of circuits (e.g., circuits for different wireless communication systems) included in the wireless communication interface 912.

Each of the antennas 916 includes a single or a plurality of antenna elements (e.g., a plurality of antenna elements constituting a MIMO antenna), and is used for transmission and reception of a radio signal from and to the wireless communication interface 912. The smartphone 900 may have a plurality of antennas 916 as illustrated in FIG. 17. Note that although FIG. 17 illustrates an example in which the smartphone 900 includes the plurality of the antennas 916, the smartphone 900 may include a single antenna 916.

Furthermore, the smartphone 900 may include the antenna 916 for each wireless communication system. In this configuration, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to the respective blocks of the smartphone 900 illustrated in FIG. 17 via feed lines partially indicated by a broken line in the drawing. The auxiliary controller 919 causes minimum necessary functions of the smartphone 900 to be performed, for example, in a sleep mode.

Second Application Example

Figure 18:
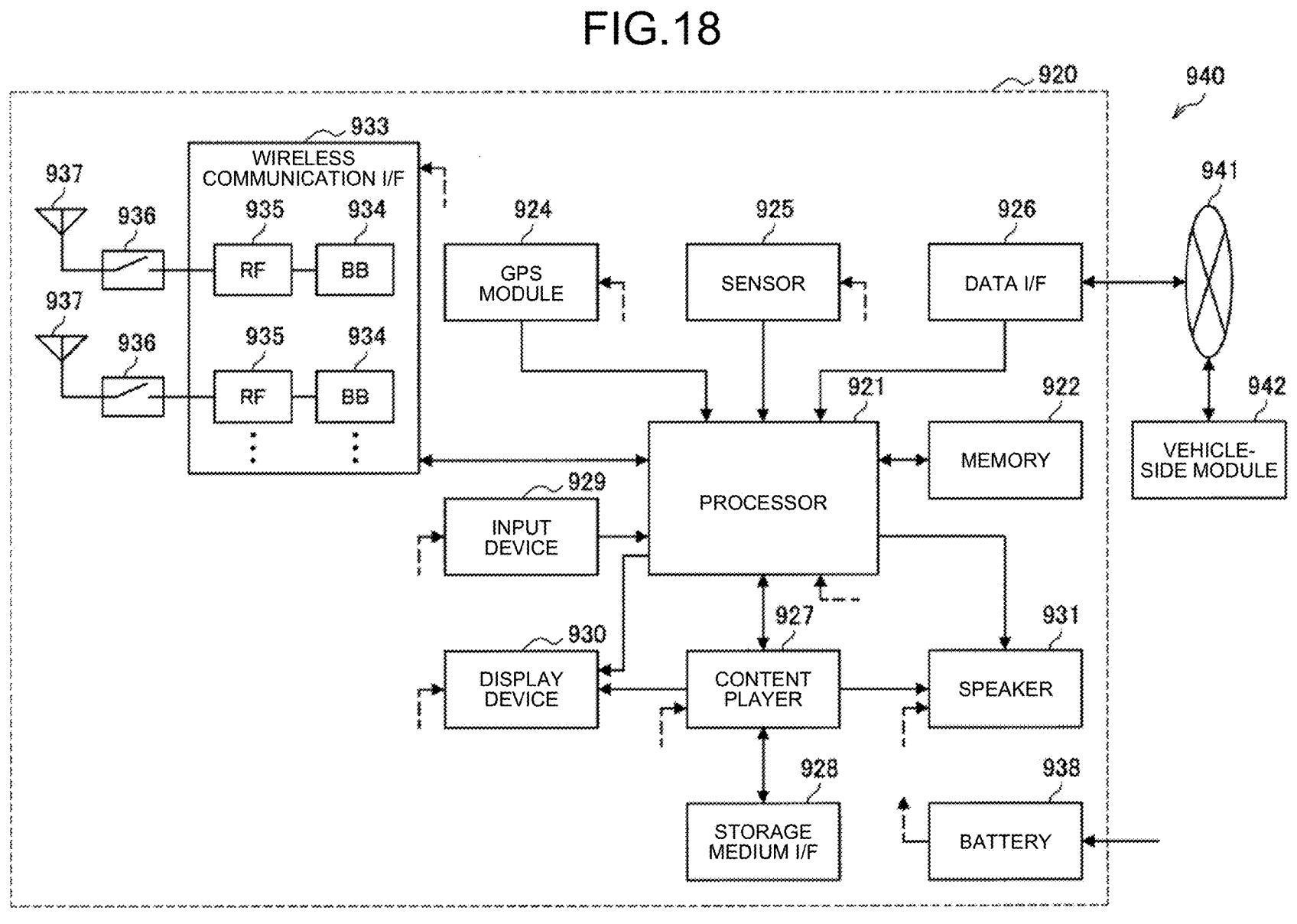

FIG. 18 is a block diagram illustrating an example of a schematic configuration of a car navigation device 920 to which a technology according to the present disclosure is applicable. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, CPU or SoC, and controls a navigation function and the other functions of the car navigation device 920. The memory 922 includes RAM and ROM, and stores programs and data executed by the processor 921.

The GPS module 924 uses a GPS signal received from a GPS satellite to measure a position (e.g. latitude, longitude, and altitude) of the car navigation device 920. The sensor 925 can include, for example, a sensor group of a gyroscope sensor, geomagnetic sensor, pressure sensor, and the like. The data interface 926 is connected to an in-vehicle network 941 via, for example, a terminal which is not illustrated and acquires data, such as vehicle speed data, generated on the vehicle side.

The content player 927 reproduces content stored in a storage medium (e.g., CD or DVD) inserted into the storage medium interface 928. The input device 929 includes, for example, a touch sensor that detects a touch on a screen of the display device 930, a button, or a switch, and receives an operation or information input from the user. The display device 930 has a screen such as an LCD or OLED display, and displays a navigation function or an image of content to be played back. The speaker 931 outputs sound of the navigation function or the content played back.

The wireless communication interface 933 supports any cellular communication system such as LTE or LTE-Advanced, and performs wireless communication. The wireless communication interface 933 may typically include a BB processor 934, an RF circuit 935, and the like. The BB processor 934 may perform, for example, encoding/decoding, modulation/demodulation, and multiplexing/demultiplexing, and executes various signal processing for wireless communication. Meanwhile, the RF circuit 935 may include a mixer, a filter, an amplifier, and the like, and transmits and receives a radio signal via the antenna 937. The wireless communication interface 933 may be a one-chip module on which the BB processor 934 and the RF circuit 935 are integrated. The wireless communication interface 933 may include a plurality of the BB processors 934 and a plurality of the RF circuits 935 as illustrated in FIG. 18. Note that although the example in which the wireless communication interface 933 includes the plurality of BB processors 934 and the plurality of RF circuits 935 is illustrated in FIG. 18, the wireless communication interface 933 may include a single BB processor 934 or a single RF circuit 935.

Furthermore, in addition to the cellular communication system, the wireless communication interface 933 may support another type of wireless communication system such as a near field wireless communication system, a proximity wireless communication system, or a wireless Local Area Network (LAN) system, and may include the BB processor 934 and the RF circuit 935 for each wireless communication system, in such a configuration.

The antenna switches 936 are configured to switch the connection destinations of the antennas 937, between a plurality of circuits (e.g., circuits for different wireless communication systems) included in the wireless communication interface 933.

Each of the antennas 937 includes a single or a plurality of antenna elements (e.g., a plurality of antenna elements constituting a MIMO antenna), and is used for transmission and reception of a radio signal from and to the wireless communication interface 933. The car navigation device 920 may have a plurality of antennas 937 as illustrated in FIG. 18. Note that although FIG. 18 illustrates an example in which the car navigation device 920 includes the plurality of the antennas 937, the car navigation device 920 may include a single antenna 937.

Furthermore, the car navigation device 920 may include the antenna 937 for each wireless communication system. In this configuration, the antenna switches 936 may be omitted from the configuration of the car navigation device 920.

The battery 938 supplies power to the respective blocks of the car navigation device 920 illustrated in FIG. 18 via feed lines partially indicated by a broken line in the drawing. In addition, the battery 938 accumulates power supplied from the vehicle side.

Furthermore, the technology according to the present disclosure may be implemented as an in-vehicle system (or vehicle) 940 that includes one or more blocks of the car navigation device 920 described above, and further includes the in-vehicle network 941 and a vehicle-side module 942. The vehicle-side module 942 generates vehicle-side data such as a vehicle speed, an engine speed, or failure information, and outputs the generated data to the in-vehicle network 941.

4. OTHER EMBODIMENTS

The processes according to the embodiments descried above may be performed in various different forms in addition to those in the embodiments described above.

In the above embodiments, switching the signal waveforms used for downlink communication mainly in the cellular communication has been described. However, the signal waveforms used for the downlink communication may be switched in communication other than the cellular communication, as well. For example, in a case where a signal is transmitted from a wireless communication device mounted in a satellite (hereinafter, also referred to as satellite station) to a wireless communication device on the ground (hereinafter, also referred to as terrestrial station), the satellite station may switch the signal waveforms.

In the satellite communication, unlike the cellular communication described above, communication is performed using microwaves instead of the millimeter waves. However, in the satellite communication, a high-performance power amplifier cannot be mounted in the satellite station, in some cases. In this case, a signal waveform having low PAPR may be required in order to operate the power amplifier with a high output to send a signal to the ground station. Therefore, also in satellite communication, switching the signal waveforms using the technology of the present disclosure makes it possible to further improve the transmission efficiency while satisfying low PAPR.

5. SUPPLEMENTARY NOTES

Preferred embodiments of the present disclosure have been described above in detail with reference to the accompanying drawings, but the technical scope of the present disclosure is not limited to these examples. A person skilled in the art of the technical field for the present disclosure may obviously find various alternations and modifications within the technical concept described in claims, and it should be understood that they will naturally come under the technical scope of the present disclosure.

Of the processes described in the above embodiments, all or some of processes described to be performed automatically may be performed manually, or all or some of processes described to be performed manually may be performed automatically by a known method. In addition, the process procedures, specific names, and information including various data and parameters, which are illustrated in the above description or the drawings can be appropriately changed unless otherwise specified. For example, various information illustrated in the drawings are not limited to the illustrated information.

Furthermore, the component elements of the devices are illustrated as functional concepts and are not necessarily required to be physically configured as illustrated. In other words, specific forms of distribution or integration of the devices are not limited to those illustrated, and all or some of the specific forms may be configured by being functionally or physically distributed or integrated in appropriate units, according to various loads or usage conditions.

Furthermore, the above embodiments and modifications can be appropriately combined within a range consistent with the contents of the processes. Furthermore, in the above embodiments, a microscope has been described as an example of the image processing apparatus, but the image processing of the present disclosure is also applicable to an image capturing device other than the microscope.

Furthermore, the effects descried herein are merely explanatory or exemplary, and not limitative. In other words, the technology according to the present disclosure can achieve other effects that are apparent to those skilled in the art from the description herein, along with or instead of the above effects.

The present technology may also be configured as below.

(1)

A terminal device comprising a control unit acquiring, from a base station apparatus, information about a signal waveform for use, of a plurality of signal waveforms including a single carrier signal, the signal waveform for use being used for downlink communication with the base station apparatus, the information being transmitted by using a predetermined signal waveform of the plurality of signal waveforms, and performing the downlink communication with the base station apparatus by using the signal waveform for use, based on the information.

(2)

The terminal device according to (1), wherein the information about the signal waveform for use is included in system information.

(3)

The terminal device according to (2), wherein the control unit receives at least one of a synchronization signal block, Physical Downlink Control Channel (PDCCH), or Physical Downlink Shared Channel (PDSCH) scheduled by PDCCH, by using a predetermined signal waveform, regardless of the signal waveform for use.

(4)

The terminal device according to (1) wherein the information about the signal waveform for use is transmitted by using RRC signaling.

(5)

The terminal device according to (1), wherein the information about the signal waveform for use is included in field of DCI in PDCCH.

(6)

The terminal device according to (1), wherein the signal waveform for use is a signal waveform that is used for uplink communication with the base station apparatus.

(7)

The terminal device according to (1), wherein the plurality of signal waveforms respectively corresponds to a plurality of synchronization signal sequences, and the control unit determines the signal waveform for use, according to the synchronization signal sequence received.

(8)

The terminal device according to (1), wherein the control unit uses the signal waveform for use, for communication with a secondary cell group, based on the information about the signal waveform for use that is acquired through communication with a master cell group.

(9)

A base station apparatus comprising a control unit determining a signal waveform for use that is to be used for downlink communication with a terminal device, from a plurality of signal waveforms including a single carrier signal;

notifying of information about the signal waveform for use by using a predetermined signal waveform from the plurality of signal waveforms; and performing the downlink communication with the terminal device by using the signal waveform for use that is notified of.

(10)

The base station apparatus according to (9), wherein the control unit determines the signal waveform for use, according to whether the terminal device is positioned at a cell center or a cell edge of a cell.

(11)

The base station apparatus according to (9), wherein the plurality of signal waveforms further includes a multicarrier signal, and the predetermined signal waveform is the single carrier signal.

(12)

The base station apparatus according to (11), wherein the control unit discontinuously allocates the multicarrier signal to resources; and continuously allocates the single carrier signal to resources.

(13)

The base station apparatus according to (9), wherein the control unit determines the number of data signals multiplexed, according to the signal waveform for use, when the data signals to be transmitted to a plurality of the terminal devices is multiplexed on the same resource.

(14)

The base station apparatus according to (9), wherein the control unit determines a modulation method for a signal to be transmitted to the terminal device, according to the signal waveform for use.

(15)

A communication method, comprising:

acquiring, from a base station apparatus, information about a signal waveform for use, of a plurality of signal waveforms including a single carrier signal, the signal waveform for use being used for downlink communication with the base station apparatus, the information being transmitted by using a predetermined signal waveform of the plurality of signal waveforms, and performing the downlink communication with the base station apparatus by using the signal waveform for use, based on the information.

(16)

A communication method, comprising:

determining a signal waveform for use that is to be used for downlink communication with a terminal device, from a plurality of signal waveforms including a single carrier signal;

notifying of information about the signal waveform for use by using a predetermined signal waveform from the plurality of signal waveforms; and performing the downlink communication with the terminal device by using the signal waveform for use that is notified of.

REFERENCE SIGNS LIST

1 BASE STATION APPARATUS
101 UPPER LAYER PROCESSING UNIT
103 CONTROL UNIT

105 RECEPTION UNIT
1051 DECODING UNIT
1053 DEMODULATION UNIT
1055 DEMULTIPLEXING UNIT
1057 RADIO RECEIVER
1059 CHANNEL MEASUREMENT UNIT
107 TRANSMISSION UNIT
1071 ENCODING UNIT
1073 MODULATION UNIT
1075 MULTIPLEXING UNIT
1077 RADIO TRANSMITTER
1079 DOWNLINK REFERENCE SIGNAL GENERA-
TION UNIT
109 TRANSMISSION/RECEPTION ANTENNA
2 TERMINAL DEVICE
201 UPPER LAYER PROCESSING UNIT
203 CONTROL UNIT
205 RECEPTION UNIT
2051 DECODING UNIT
2053 DEMODULATION UNIT
2055 DEMULTIPLEXING UNIT
2057 RADIO RECEIVER
2059 CHANNEL MEASUREMENT UNIT
207 TRANSMISSION UNIT
2071 ENCODING UNIT
2073 MODULATION UNIT
2075 MULTIPLEXING UNIT
2077 RADIO TRANSMITTER
2079 UPLINK REFERENCE SIGNAL GENERATION
UNIT
209 TRANSMISSION/RECEPTION ANTENNA

The invention claimed is:

1. A terminal device comprising
a transceiver; and
control circuitry configured to perform an operation, the operation comprising:
receiving, from a base station, a downlink communication via a multicarrier signal;
acquiring, from the base station, information for switching from the multicarrier signal to a specific single carrier, the specific single carrier being one of a plurality of single carriers, the information for the switching being received from the base station via a predetermined single carrier of the plurality of single carriers that is different from the specific single carrier and that is defined for, and thereby implicitly identifies, the specific single carrier, and
based on the information for the switching, switching from the multicarrier signal to the specific single carrier and receiving the downlink communication from the base station via the specific single carrier,
wherein the plurality of single carriers respectively corresponds to a plurality of synchronization signal sequences, and the received predetermined single carrier that is defined for, and thereby implicitly identifies, the specific single carrier is a waveform of a specific synchronization signal sequence of the plurality of synchronization signal sequences, and
wherein the information for the switching is implicitly indicated by a configuration of the specific synchronization signal sequence which has been provided to the communication apparatus in advance.

2. The terminal device according to claim 1, wherein the operation further comprises:
receiving at least one of a synchronization signal block, a Physical Downlink Control Channel (PDCCH), or a Physical Downlink Shared Channel (PDSCH) scheduled by the PDCCH, by using the predetermined single carrier, regardless of the specific single carrier.

3. The terminal device according to claim 1, wherein the specific single carrier is identical to a single carrier that is used for uplink communication with the base station.

4. The terminal device according to claim 1, wherein the operation further comprises:
based on the information about the switching, using the specific single carrier for communication with the base station via a secondary cell group,
wherein the information about the switching is acquired through communication with the base station via a master cell group.

5. A base station apparatus comprising:
a transceiver; and
control circuitry configured to perform an operation, the operation comprising:
transmitting, to a terminal device, a downlink communication via a multicarrier signal;
determining to switch from the multicarrier signal to a specific single carrier that is to be used by the terminal device for the downlink communication;
transmitting, to the terminal device, information for the switching from the multicarrier signal to the specific single carrier, the specific single carrier being one of a plurality of single carriers, the information for the switching being transmitted to the terminal device via a predetermined single carrier of the plurality of single carriers that is different from the specific single carrier and that is defined for, and thereby implicitly identifies, the specific single carrier; and
based on the information for the switching, switching from the multicarrier signal to the specific single carrier and transmitting the downlink communication to the terminal device via the specific single carrier,
wherein the plurality of single carriers respectively corresponds to a plurality of synchronization signal sequences, and the received predetermined single carrier that is defined for, and thereby implicitly identifies, the specific single carrier is a waveform of a specific synchronization signal sequence of the plurality of synchronization signal sequences, and
wherein the information for the switching is implicitly indicated by a configuration of the specific synchronization signal sequence which has been provided to the communication apparatus in advance.

6. The base station apparatus according to claim 5, wherein the determining to switch comprises determining to switch based on a predetermined criteria that comprises at least one of:
a terminal device position parameter, or
a channel width or bandwidth parameter, or
a time length or a slot length parameter.

7. The base station apparatus according to claim 5, wherein the operation further comprises:
discontinuously allocating the multicarrier signal to communication resources used to communicate with the terminal device; and
continuously allocating the single carrier signal to the communication resources.

8. The base station apparatus according to claim 5, wherein the operation further comprises determining a number of data signals to be multiplexed into the specific single carrier, when the data signals to be transmitted to a plurality of the terminal devices are multiplexed on a same resource.

9. The base station apparatus according to claim 5, wherein the operation further comprises:

determining a modulation method for a signal to be transmitted to the terminal device, according to the specific single carrier.

10. A communication method performed by a terminal device, the communication method comprising:

receiving, from a base station, a downlink communication via a multicarrier signal;

acquiring, from the base station, information for switching from the multicarrier signal to a specific single carrier, the specific single carrier being one of a plurality of single carriers, the information for the switching being received from the base station via a predetermined single carrier of the plurality of single carriers that is different from the specific single carrier and that is defined for, and thereby implicitly identifies, the specific single carrier, and based on the information for the switching, switching from the multicarrier signal to the specific single carrier and receiving the downlink communication from the base station via the specific single carrier, wherein the plurality of single carriers respectively corresponds to a plurality of synchronization signal sequences, and the received predetermined single carrier that is defined for, and thereby implicitly identifies, the specific single carrier is a waveform of a specific synchronization signal sequence of the plurality of synchronization signal sequences, and wherein the information for the switching is implicitly indicated by a configuration of the specific synchronization signal sequence which has been provided to the communication apparatus in advance.

11. A communication method performed by a base station device, the communication method comprising:

transmitting, to a terminal device, a downlink communication via a multicarrier signal;

determining to switch from the multicarrier signal to a specific single carrier that is to be used by the terminal device for the downlink communication;

transmitting, to the terminal device, information for the switching from the multicarrier signal to the specific single carrier, the specific single carrier being one of a plurality of single carriers, the information for the switching being transmitted to the terminal device via a predetermined single carrier of the plurality of single carriers that is different from the specific single carrier and that is defined for, and thereby implicitly identifies, the specific single carrier; and based on the information for the switching, switching from the multicarrier signal to the specific single carrier and transmitting the downlink communication to the terminal device via the specific single carrier, wherein the plurality of single carriers respectively corresponds to a plurality of synchronization signal sequences, and the received predetermined single carrier that is defined for, and thereby implicitly identifies, the specific single carrier is a waveform of a specific synchronization signal sequence of the plurality of synchronization signal sequences, and wherein the information for the switching is implicitly indicated by a configuration of the specific synchronization signal sequence which has been provided to the communication apparatus in advance.

* * * * *